United States Patent
Kawahara

(10) Patent No.: US 8,386,692 B2
(45) Date of Patent: Feb. 26, 2013

(54) METHOD FOR COMMUNICATING BETWEEN NODES AND SERVER APPARATUS

(75) Inventor: Jun Kawahara, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 12/929,570

(22) Filed: Feb. 1, 2011

(65) Prior Publication Data

US 2011/0138099 A1    Jun. 9, 2011

Related U.S. Application Data

(63) Continuation of application No. PCT/JP2008/064698, filed on Aug. 18, 2008.

(51) Int. Cl.
*G06F 13/00* (2006.01)
(52) U.S. Cl. ........................ 710/317; 710/306
(58) Field of Classification Search .......... 710/305, 710/306, 311, 312, 313, 316, 317; 709/220
See application file for complete search history.

(56) References Cited

U.S. PATENT DOCUMENTS

| | | | | |
|---|---|---|---|---|
| 4,603,416 A * | 7/1986 | Servel et al. | ........... | 370/417 |
| 5,422,881 A * | 6/1995 | May et al. | ........... | 370/392 |
| 5,465,251 A * | 11/1995 | Judd et al. | ........... | 370/351 |
| 6,044,076 A * | 3/2000 | Yamamoto | ........... | 370/392 |
| 7,161,937 B1 * | 1/2007 | Dunning et al. | ........... | 370/389 |
| 7,571,273 B2 * | 8/2009 | Boyd et al. | ........... | 710/316 |
| 2005/0281282 A1 * | 12/2005 | Gonzalez et al. | ........... | 370/422 |
| 2006/0242333 A1 * | 10/2006 | Johnsen et al. | ........... | 710/30 |
| 2007/0097950 A1 * | 5/2007 | Boyd et al. | ........... | 370/351 |
| 2007/0183393 A1 * | 8/2007 | Boyd et al. | ........... | 370/351 |

FOREIGN PATENT DOCUMENTS

| | | |
|---|---|---|
| JP | 7-200435 | 8/1995 |
| JP | 2000-132527 | 5/2000 |
| JP | 2003-122729 | 4/2003 |
| JP | 2004-258998 | 9/2004 |

OTHER PUBLICATIONS

International Search Report for PCT/JP2008/064698 mailed Nov. 18, 2008.
English Translation of the International Preliminary Report on Patentability mailed Mar. 3, 2011 in corresponding International Patent Application PCT/JP2008/064698.

* cited by examiner

*Primary Examiner* — Khanh Dang
(74) *Attorney, Agent, or Firm* — Staas & Halsey LLP

(57) ABSTRACT

According to an aspect of the embodiment, an input/output device transmits a message to a first node controller of a parent node which is set in advance via a cross bar. At this point, the cross bar generates information based on node information of the input/output device, and adds the generated information to the message. The first node controller transmits, via the cross bar, the message to a second node controller of a parent node corresponding to an input/output device that is to receive the message. The second node controller transmits, via the cross bar, the message to an input/output device that is to receive the message. At this point, the cross bar transmits the message restored by deleting the generated information from the message to the input/output device which is set as a destination.

9 Claims, 17 Drawing Sheets

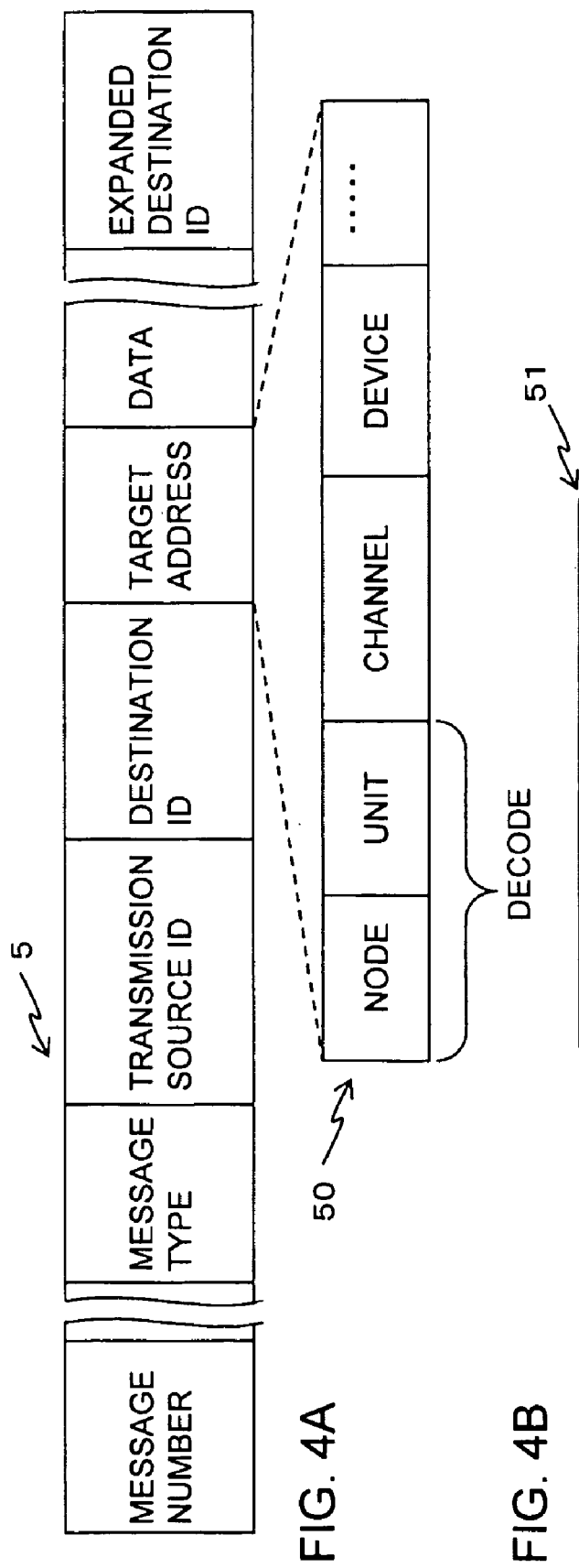

METHOD FOR COMMUNICATING BETWEEN NODES AND SERVER APPARATUS

CROSS-REFERENCE TO RELATED APPLICATIONS

This is a continuation application of PCT application serial number PCT/JP2008/064698, filed on Aug. 18, 2008.

FIELD

The embodiments discussed herein are related to a method for communicating between nodes and a server apparatus.

BACKGROUND

A server system includes system boards each of which is mounted with processors, a cross bar, IOCs (Input/Output component or input/output devices), and node controllers, for example. In the above server system, bit length of destination IDs used by the IOCs and so on is fixed. Therefore, there is a limit in the number of destination IDs. This is because, when the server system is installed, the number of bits of destination IDs is not necessarily secured assuming a large system.

When the number of bits of destination IDs is "3", the IOCs and so on can issue messages to only "8" kinds of destinations. When the number of connection destinations is "8" or less, the IOCs and so on can transmit messages to other all IOCs and so on.

However, there is a case, that the number of connection destinations increases from "8" or less when the server system is installed, but the number increases to nine or more, since necessity for expansion of nodes occurs after the installment. In this case, a message cannot be issued to IOCs and so on, to which destination IDs are not assigned in the server system, from the other IOCs and so on. Therefore, a user needs to change the overall structure of the server system.

A communication control apparatus between processors is known which can easily perform, within a specified number of ports, change and increase of housing positions for a processor and an input/output device housed in the apparatus.

Patent Document 1: Japanese Laid-Open Patent Publication No. 2000-132527

SUMMARY

According to an aspect of the embodiment, a method for communicating between nodes in a server apparatus is provided. The server apparatus includes a plurality of input/output devices, a plurality of processor groups each having a plurality of processors, a plurality of node controllers connected to the plurality of processor groups, and a cross bar provided between the plurality of input/output devices and the plurality of node controllers, and transmits and receives a message between the plurality of input/output devices and the plurality of processors via the cross bar. The method includes: transmitting a message from an input/output device to a cross bar designating a first node controller as a fixed destination, the first node controller being a node controller associated with the input/output device, the message including a fixed-length destination ID that is identification information assigned to an input/output device or a node controller that is to receive the message, and internal information for specifying a target; transmitting the message from the cross bar to the first node controller; generating information indicating the target based on the internal information of the received message at the first node controller; adding the generated information to the message; transmitting the message added with the generated information from the first node controller to the cross bar designating a second node controller as a destination, the second node controller being a node controller associated with an input/output device that is the target or a node controller connected to a processor group having a processor that is the target; restoring the message by deleting the generated information from the message added with the generated information at the cross bar; and transmitting the restored message to the second node controller.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIGS. 4A, 4B and 4C are diagrams illustrating details of a message and a first destination determining method;

DESCRIPTION OF EMBODIMENTS

Figure 16:
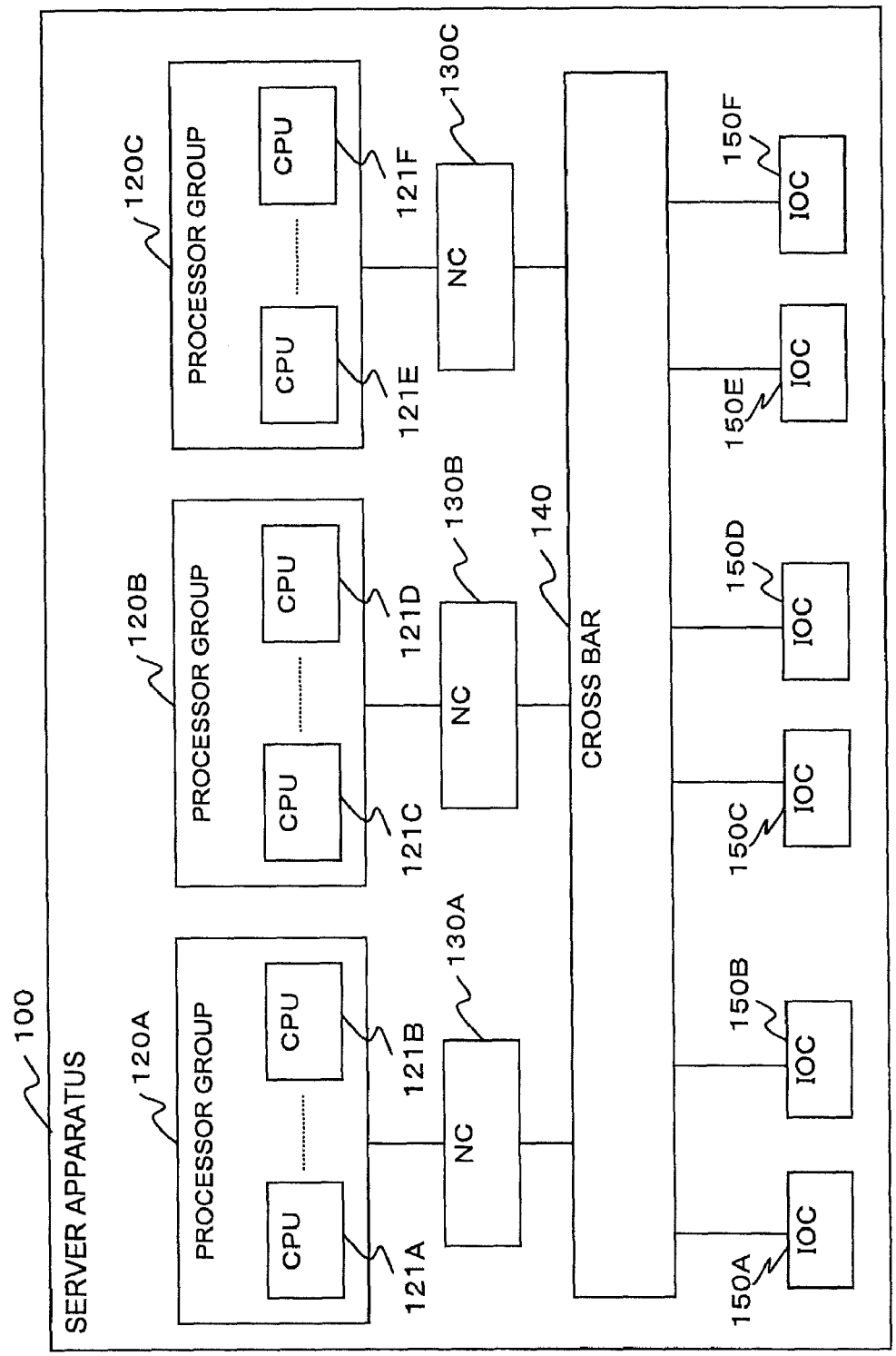
FIG. 16 is a diagram illustrating a structure of a server system as a background of the present invention.
Figure 17:
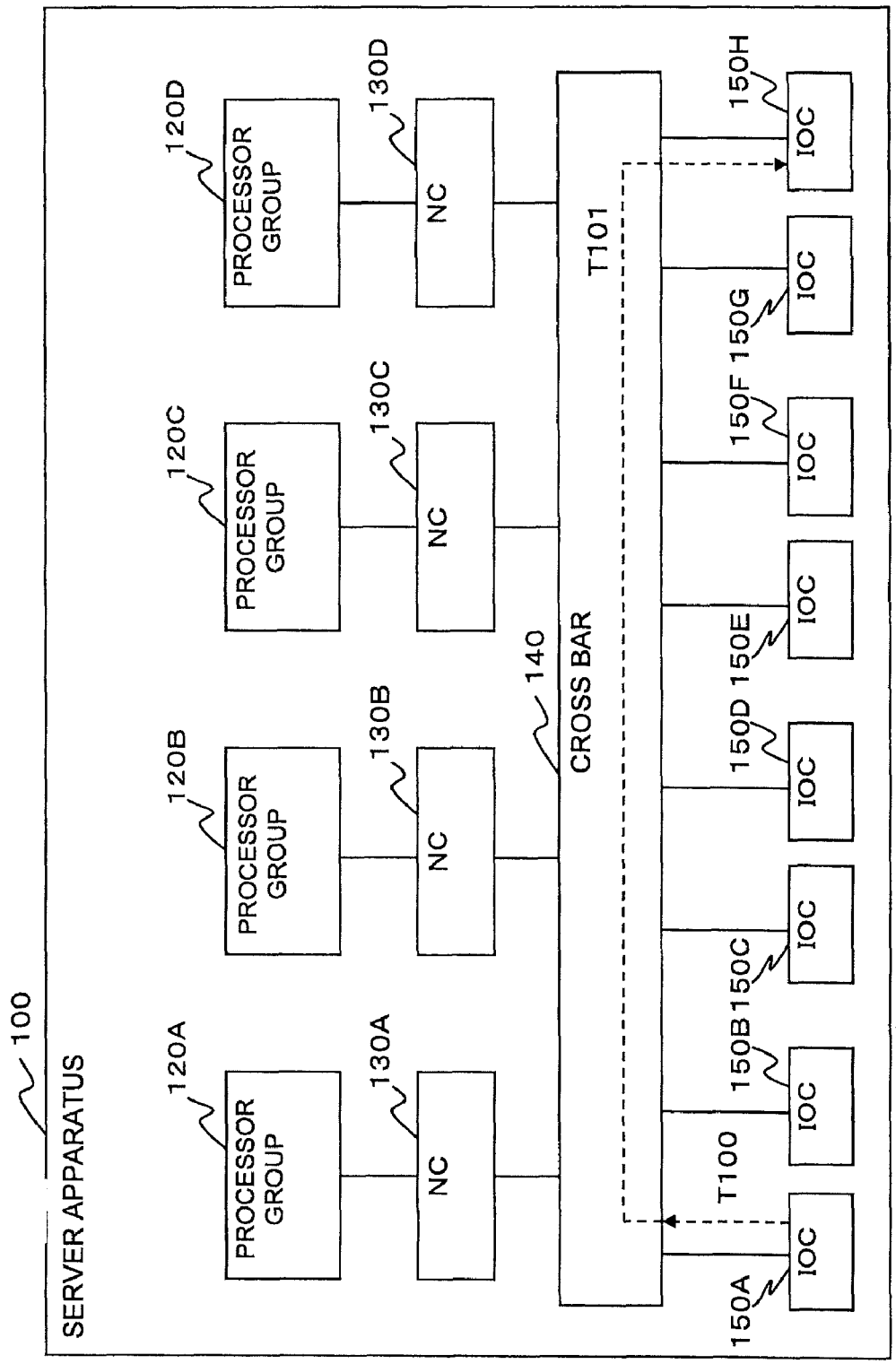
FIG. 17 is a diagram illustrating processing in the server system as the background of the present invention.

FIGS. 16 and 17 are diagrams illustrating a problem which is examined by the inventor and is a background of the present invention. FIG. 16 illustrates a structure of a server system. FIG. 17 illustrates a case in which IOCs are added in the server system illustrated in FIG. 16.

A server apparatus 100 includes a plurality of processor groups 120, a plurality of node controllers (hereinafter, NCs) 130, a cross bar 140, and a plurality of IOCs 150. Each processor group 120 is a group of processors, and includes a plurality of CPUs 121. When each of the plurality of processor groups 120 is distinguished, the processor group 120 is represented as a "processor group 120A" with a suffix such as "A" attached, for example. The same applies to the CPUs 121, the NCs 130, and the IOCs 150.

The processor group 120, which is a management target of the NCs 130, is assigned to the NC 130 by the server apparatus 100. The NC 130 performs transmission control for the processor group 120 which is the management target of the NC 130 itself. The NC 130 has a function (address decoder, for example) of determining a destination ID of a message from the processor group 120.

The cross bar 140 is a switching device that mediates transmission between the NC 130 (the CPU 121) and the IOC 150. When a response message is received from the IOC 150 and so on, the cross bar 140 transmits the message to the IOC 150 indicated by destination ID, or the NC 130 connected to the CPU 121 indicated by the destination ID.

For example, when the destination ID has "3" bits, destinations of a message by the IOC 150 are "8" kinds. When attention is directed to the IOC 150A, as illustrated in FIG. 16, connection destinations of the IOC 150A are "8" places of the IOCs 150B to 150F and the NCs 130A to 130C. Therefore, the IOC 150A can transmit messages to all the other IOCs 150 and so on.

FIG. 17 illustrates an example in which, when initial server system installation is a structure illustrated in FIG. 16, IOCs and so on are added to the node structure illustrated in FIG. 16.

For example, it is assumed that, in the existent server apparatus 100 illustrated in FIG. 16, a user adds a processor group 120D, an NC 130D, IOCs 150G and 150H, and CPUs 121G and 121H. In this case, since all "8" destination IDs (0 to 7) are used as destination IDs assigned to the existent IOCs 150 and so on, destination IDs cannot be assigned to the new IOCs 150G and 150H and the new NC 130D.

Therefore, to add the IOCs 150 and so on (in other words, to expand nodes), there is no other way but to change the structure of the existent server apparatus 100. Specifically, to increase the number of bits of a destination ID, it is necessary to change a protocol of communication in the server apparatus 100, to change the design of (redesign) the cross bar 140 that transmits and receives the message, and to change the designs of the IOCs 150 and the NCs 130 that transmit and receive the message.

A method for communicating between nodes is provided which makes it possible to easily perform expansion of nodes in a server system including system boards, which are mounted with processors, and input/output devices.

A server apparatus is provided which makes it possible to easily perform expansion of nodes in a server system including system boards, which are mounted with processors, and input/output devices.

A program for realizing a method for communicating between nodes is provided which makes it possible to easily perform expansion of nodes in a server system including system boards, which are mounted with processors, and input/output devices.

According to the method for communicating between nodes and the server apparatus, the input/output device or the CPU transmits a message to the first node controller, which is the fixed destination. In this transmission processing, a destination ID is a unit ID of the first node controller. On the other hand, the first node controller transmits, using temporary information generated based on the message, the message added with the temporary information to the cross bar. The cross bar transmits a restored message to the second controller.

Consequently, a message that is originally needed to transmit to a target according to only an original destination ID having a few number of bits is transmitted to the target with the destination ID expanded by being transmitted through the first and second node controllers. As a result, in an existent server apparatus, even when nodes are expanded by, for example, addition of input/output devices, it is unnecessary to substantially change the structure of the server apparatus. In other words, it is possible to eliminate the necessity of substantial design changes of the cross bar, the input/output devices, and the node controllers simply by adding a function of processing the temporary information to the node controllers and the cross bar. This makes it possible to easily add nodes in the server apparatus.

Preferred embodiments of the present invention will be explained with reference to accompanying drawings.

Figure 1:
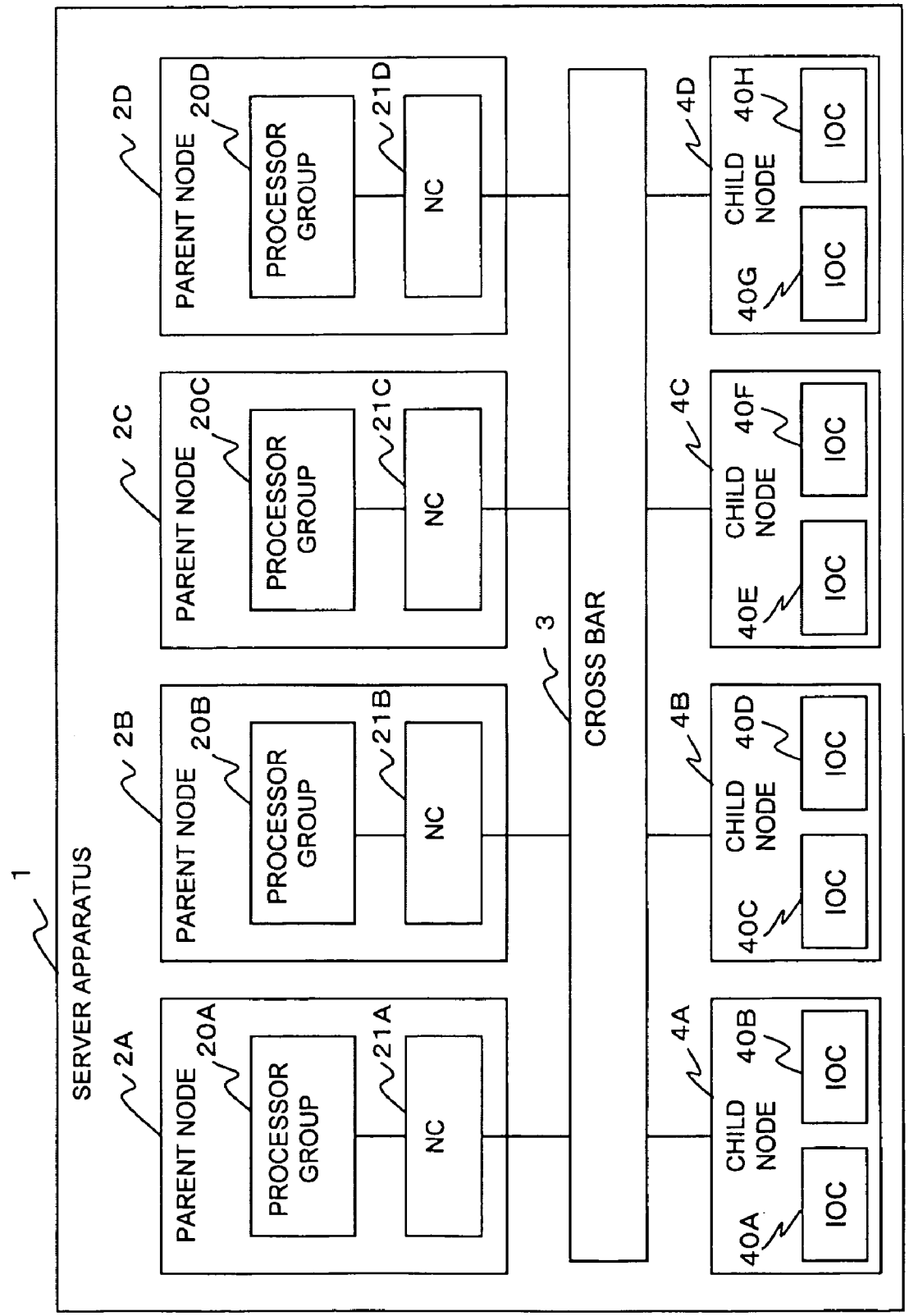
FIG. 1 is a diagram illustrating an example of a structure of a server system.
Figure 2:
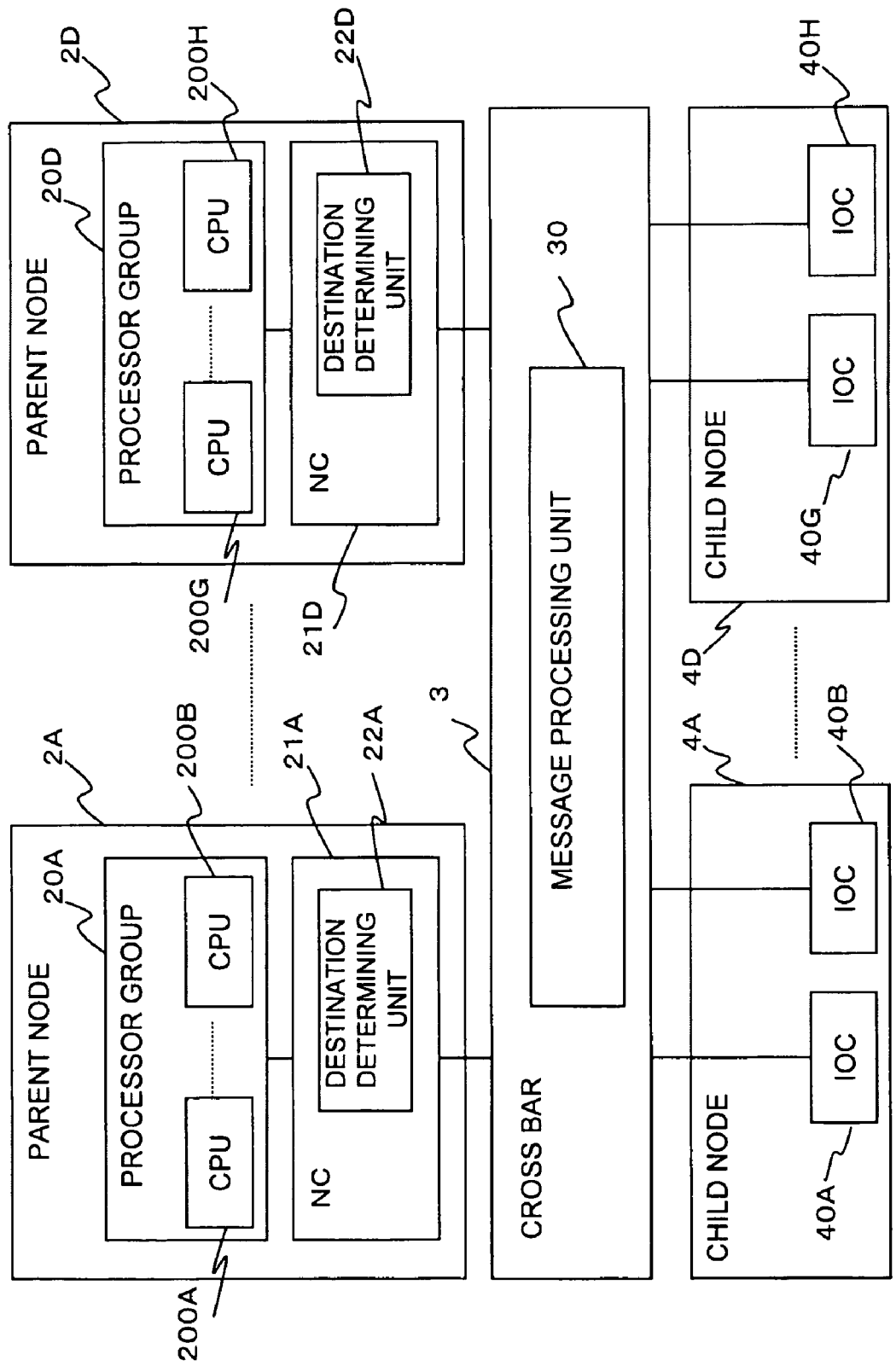
FIG. 2 is a diagram of a detailed example of a structure of the server system illustrated in FIG. 1.

FIG. 1 is a diagram of a server system as an embodiment of the present invention. FIG. 2 is a diagram illustrating an example of a method for communicating between nodes in the server system illustrated in FIG. 1.

In FIG. 1, a server apparatus 1 includes a plurality of processor groups 20, a plurality of NCs (node controllers) 21, a cross bar 3, and a plurality of IOCs (input/output devices) 40. Each of the processor groups 20 includes a plurality of CPUs 200. The cross bar 3 is provided between the plurality of IOCs 40 and the plurality of NCs 21. The server apparatus 1 transmits and receives a message 5, which is explained later with reference to FIGS. 4A to 4C and FIGS. 5A to 5B, between the plurality of IOCs 40 and the plurality of CPUs 200 via the cross bar 3.

The message 5 is information transmitted and received between the plurality of IOCs 40 and the plurality of CPUs 200 via the cross bar 3, and is a request (processing request) or a response to the request, for example. The message 5 may include data.

In this example, the NCs 21 are associated with the processor groups 20 in a one-to-one relation in advance, and are connected to the processor groups 20. Therefore, actually, the message 5 is transmitted and received between the plurality of IOCs 40 and the plurality of NCs 21 by the cross bar 3. For this purpose, destination IDs are assigned in advance to each of the plurality of IOCs 40 and each of the plurality of NCs 21. The processor groups 20 and the NCs 21 corresponding with each other are referred to as parent nodes 2. In this example, the parent nodes 2 (or the processor groups 20) and the plurality of IOCs 40 are associated with each other in advance. The plurality of IOCs 40 corresponding to the parent nodes 2 are referred to as child nodes 4 of the parent nodes 2.

When each of the plurality of processor groups 20 is distinguished, the processor group 20 is represented as, for example, a "processor group 20A" with a suffix such as "A" attached. The same applies to the NCs 21, the IOCs 40, the parent nodes 2, and the child nodes 4.

A range of the parent node 2 is set in advance. As illustrated in FIG. 2, the parent node 2 includes one processor group 20 having the plurality of CPUs 200 and one NC 21 as a range of the parent node 2. A range of the child node 4 is set in advance. For example, the child node 4A includes the IOCs 40A and 40B as a range of the child node 4A.

The IOC 40 is, for example, a chip component that connects various I/O devices such as PCI devices and a system bus. The IOC 40 sets the NC (a first NC) 21 of the parent node 2 corresponding thereto as a destination in transmission of the message 5. The destination is set in a destination determining unit of the IOC 40 by a user in advance.

The IOC 40 transmits the message 5. The message 5 includes a fixed-length destination ID and internal information. The destination ID is identification information assigned to a target in advance. The internal information is information for specifying the target. The target is a device that is to receive the message 5, in other words, the IOC 40 or the CPU 200 that is to receive the message 5. The IOC 40 transmits the message 5 to the cross bar 3 with the unit ID of the NC 21, which is set in advance, set as a fixed destination ID. In this case, the NC set in advance (hereinafter, first NC) 21 is a node controller associated with the IOC 40 in advance, in other words, the NC 21 of the parent node 2 of the IOC 40. The NC 21 that receives the message 5 is the first NC 21.

The cross bar 3 is a switching device for performing transmission and reception of the message 5 between the NC 21 and the IOC 40. In this transmission and reception, the cross bar 3 adds or deletes predetermined information (expanded destination ID explained later) to or from the message 5.

The cross bar 3 receives the message 5 transmitted by the IOC 40 and transmits the message 5 to the first NC 21. Specifically, when the cross bar 3 receives the message 5 from the IOC 40, the cross bar 3 transmits the message 5 to the NC 21 belonging to the parent node 2 corresponding to the child node 4 to which the IOC 40 belongs (hereinafter, IOC-belonging child node 4) (hereinafter, corresponding parent node 2).

On the other hand, like the IOC 40, the CPU 200 transmits the message 5. As explained above, the message 5 includes the destination ID and the internal information. Like the IOC 40, the CPU 200 transmits the message 5 to the NC (the first NC) 21 of the parent node 2 to which the CPU 200 belongs. In this case, the first NC 21 is a node controller connected to the processor group 20 having the CPU 200, in other words, the NC 21 of the parent node 2.

The NC 21 performs transmission control for the message 5 from the processor group 20 of the parent node 2 to which the NC 21 belongs and a message from the IOC 40 of the child node 4 corresponding to the parent node 2. Specifically, the NC 21 transmits the message 5, which is sent from the CPU 200 of the parent node 2 or the IOC 40 of the child node 4, to the other NCs 21 or the IOCs 40 via the cross bar 3.

Therefore, as illustrated in FIG. 2, the NC 21 includes a destination determining unit 22 for determining a destination of the message 5 transmitted from the processor group 20 or the IOC 40. The destination determining unit 22 transmits the message 5 for the CPU 200 of the processor group 20, which is assigned to the destination determining unit 22 as the management target, to the CPU 200. The destination determining unit 22 receives the message 5 from the CPU 200 or the message 5 to the CPU 200. The received message 5 is transmitted to the IOC 40 and so on corresponding thereto by the cross bar 3.

When the target is the CPU 200 belonging to the corresponding parent node 2, the first NC 21 transmits the message 5 to the CPU 200. When the target is the CPU 200 belonging to the parent node (hereinafter non-corresponding parent node) 2 other than the corresponding parent node 2, the first NC 21 transmits the message 5 to the cross bar 3. When the target is the IOC 40 belonging to the IOC-belonging child node 4 or the IOC 40 belonging to the child node other than the IOC-belonging child node 4 (hereinafter, non-IOC-belonging child node) 4, the NC 21 transmits the message 5 to the cross bar 3.

At this point, the first NC 21 generates, based on the internal information of the message 5 received from the IOC 40 or the NC 21, temporary information (an expanded destination ID explained later) representing the target. Then, the first NC 21 adds the generated temporary information to the message 5. Thereafter, the first NC 21 transmits the message 5 with the temporary information added to the cross bar 3 with a second NC 21 set as a destination. The second NC 21 is a node controller associated with the IOC 40 which is the target in advance (in other words, the NC 21 of the parent node 2 of the target), or a node controller connected to the processor group 20 having the CPU 200 which is the target (in other words, the NC 21 of the parent node 2 to which the target belongs).

The cross bar 3 receives the message 5 with the temporary information added from the first NC 21 and deletes the temporary information from the received message 5 with the temporary information added to thereby restore the message 5. Thereafter, the cross bar 3 transmits the restored message 5 to the second NC 21. The second NC 21 receives the message 5 restored by the deletion of the temporary information.

Based on the received message 5, when the target is the CPU 200 belonging to the parent node 2 to which the second NC 21 belongs, the second NC 21 transmits the message 5 to the CPU 200. When the target is the IOC 40 belonging to the child node 4 corresponding to the parent node 2 to which the second NC 21 belongs, the NC 21 transmits the message 5 to the cross bar 3. The cross bar 3 transmits the received message 5 to the IOC 40 belonging to the child node 4.

Figure 3:
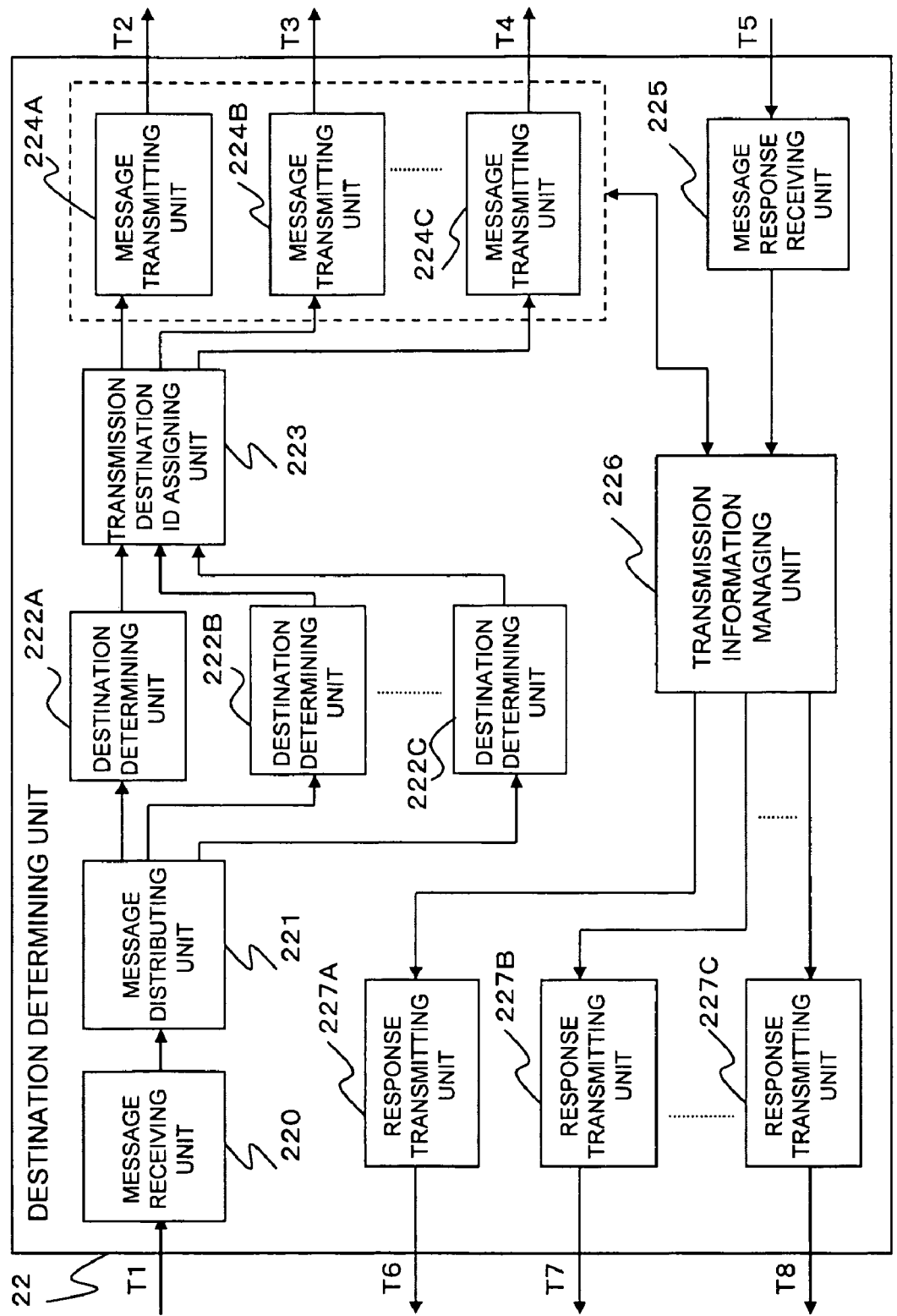
FIG. 3 is a diagram illustrating a detailed structure of a destination determining unit.

FIG. 3 is a diagram illustrating a detailed structure of the destination determining unit 22 in the NC 21 illustrated in FIG. 2.

The destination determining unit 22 includes a message receiving unit 220, a message distributing unit 221, a plurality of destination determining units 222, a transmission destination ID assigning unit 223, a plurality of message transmitting units 224, a message response receiving unit 225, a transmission information managing unit 226, and a plurality of response transmitting units 227. When each of the plurality of destination determining units 222 is distinguished, the destination determining unit 222 is represented as, for example, "destination determining unit 222A" with a suffix such as "A" attached. The same applies to the message transmitting units 224 and the response transmitting units 227.

The message receiving unit 220 receives the message 5 from the CPU 200 belonging to the processor group 20 of the corresponding parent node 2 (T1) and sends the message 5 to the message distributing unit 221. The message distributing unit 221 sends, according to predetermined information (hereinafter, internal information) included in the received message 5, the message 5 to the destination determining unit 222 corresponding to the internal information.

Subsequently, the destination determining unit 222 determines a destination based on the internal information of the received message 5. The transmission destination ID assigning unit 223 rewrites a destination ID with a unit ID of the destination determined by the destination determining unit 222 and, after adding an ID of a destination node to the message 5 as an expanded destination ID (FIGS. 4A and 5A), sends the message 5 to the message transmitting unit 224 corresponding to the expanded destination ID.

When the message 5 is transmitted from the message transmitting unit 224, the transmission information managing unit 226 records and manages information such as a transmission source of the received message 5 and a transmission destination of the transmitted message 5.

After the message transmitting unit 224 transmits the message 5 (T2, T3, and T4), the message response receiving unit 225 receives a message responding to the transmitted message 5 (hereinafter, response message) (T5). The message response receiving unit 225 sends the response message 5 to the transmission information managing unit 226. The transmission information managing unit 226 checks to which transmitted message 5 the response message 5 corresponds. After specifying a destination of the response message 5, the transmission information managing unit 226 sends the response message 5 to the response transmitting unit 227 corresponding to the destination. The response transmitting unit 227 that receives the response message 5 transmits the response message 5 to a response destination corresponding to the response message 5 (T6, T7, and T8).

Figures 5A, 5B:
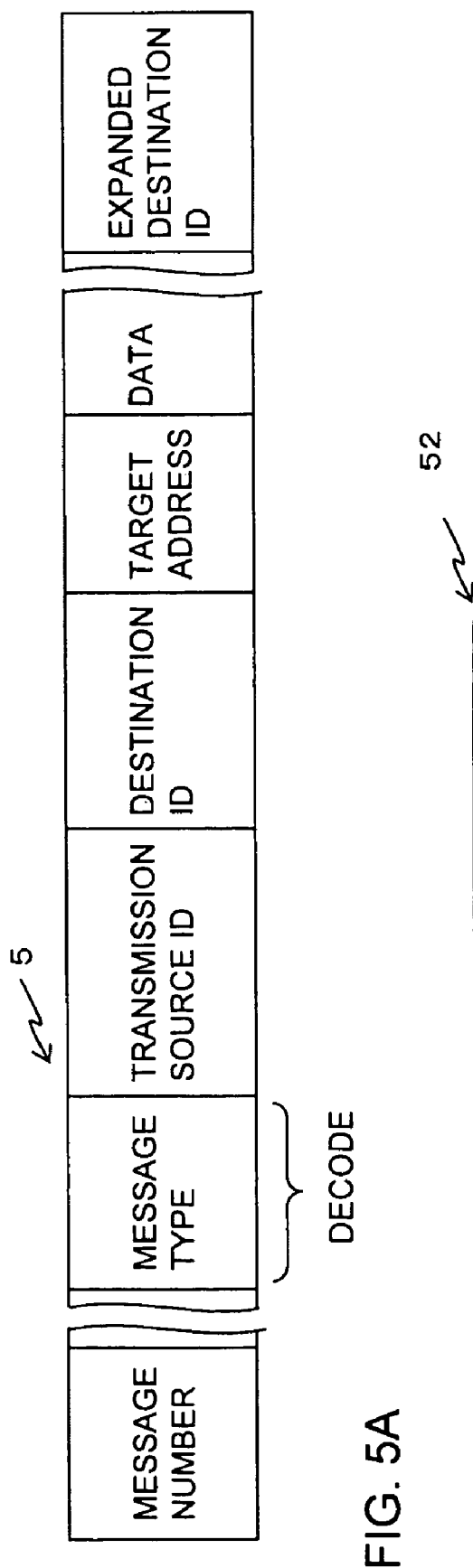
FIGS. 5A and 5B are diagrams illustrating details of a message and a second destination determining method.

FIGS. 4A, 4B and 4C are diagrams illustrating details of a message and a first destination determining method. FIGS. 5A and 5B are diagrams illustrating details of a message and a second destination determining method. FIGS. 4A to 4C and FIGS. 5A to 5B illustrate examples of the structure of the message 5 with the temporary information added.

The message 5 with the temporary information added is, for example, packet data. As illustrated in FIGS. 4A and 5A, the message 5 with the temporary information added includes the message 5 and an expanded destination ID. The message 5 includes a message number, a message type, a transmission source ID, a destination ID, a target address (50), and data. Among these items, the message type or the target address is used as internal information. The message number is given to each message in the server system. The message type is uniquely set for each type of the message 5. The transmission source ID is a unit ID of the IOC 40 and so on as a transmission source. The target address is an address of a device as a destination.

The destination ID is a unit ID of a target of the message 5. Specifically, the destination ID is a unit ID of the IOC 40 or the NC 21 that is to receive the message 5. The destination ID is identification information uniquely set in the cross bar 3 that controls transmission and reception of the message 5. Therefore, the destination ID is assigned in advance to the IOC 40 or the NC 21 connected to the cross bar 3. The cross bar 3 controls transmission and reception of the message 5 in the cross bar 3 using only this destination ID. Therefore, the cross bar 3 is not aware of information other than this destination ID.

In this way, the original message 5 is a portion other than the expanded destination ID as the temporary information. In the message 5, the order of arrangement and the numbers of bits of the respective items are set in advance. The order and the numbers of bits are set in advance according to a predetermined protocol (hereinafter referred to as fixed format). On the other hand, in an area freely usable by a user (a variable area) in the message, the expanded destination ID is described in a predetermined position (e.g., the start of the variable area).

The target address 50 of the message 5 with the temporary information added illustrated in FIG. 4A includes a node (a node number or ID), a unit (a unit number or ID), a channel (a channel number or ID), and a device (a device type number or ID), as illustrated in FIG. 4B. The unit represents a target.

The destination determining unit 222 (illustrated in FIG. 3) decodes a node and unit value illustrated in FIG. 4B and specifies a destination unit from a relation table 51 illustrated in FIG. 4C of a decode value of the node and unit value and a destination unit.

For example, when a decode value based on corresponding information of the message 5 is 000 to 200h (a hexadecimal number), the relation table 51 indicates that the destination unit is IOC-A. When the decode value is 201 to 400h, the relation table 51 indicates that the destination unit is IOC-B. The destination determining unit 22 adds an expanded destination ID (e.g., 2 bits) assigned to each node of the destination unit, or rewrites an expanded destination ID already added.

By using the expanded destination ID, the method for communicating between nodes makes it easy to expand (add) nodes in the existent server apparatus 1 and enables transmission and reception of the message 5 to and from the added nodes.

FIGS. 5A and 5B is another example of a method of specifying a destination unit (a target).

The destination determining unit 22 decodes information of a message type of the message 5 illustrated in FIG. 5A. The destination determining unit 22 specifies, based on a result of this decoding, a destination unit from a relation table 52 of a message type value and a destination unit illustrated in FIG. 5B.

For example, FIG. 5B indicates that, when the message type is XA, the destination unit is IOC-A (indicating the IOC 40A illustrated in FIG. 2) and indicates that, when the message type is XB, the destination unit is all the CPUs (indicating the CPUs 200A to 200H illustrated in FIG. 2).

The message distributing unit 221 (illustrated in FIG. 3) distributes the message 5 for each message type of the information illustrated in FIG. 5B. The destination determining unit 222 performs destination determination for the distributed message 5 and specifies a destination unit based on the relation table 52 illustrated in FIG. 5B of a destination unit.

According to the destination determining method illustrated in FIGS. 4A to 4C or FIGS. 5A to 5B explained above, the destination determining unit 22 adds an expanded destination ID (e.g., 2-bit information) to the message 5 with the specified unit set as a destination or performs, for example, rewriting of an expanded destination ID already added. Consequently, after adding the expanded destination ID to the fixed format, it is possible to transmit and receive the message 5 between the NC 21 and the cross bar 3.

Processing content of the message 5 in a message processing unit 30 in the cross bar 3 is explained below.

Figure 6:
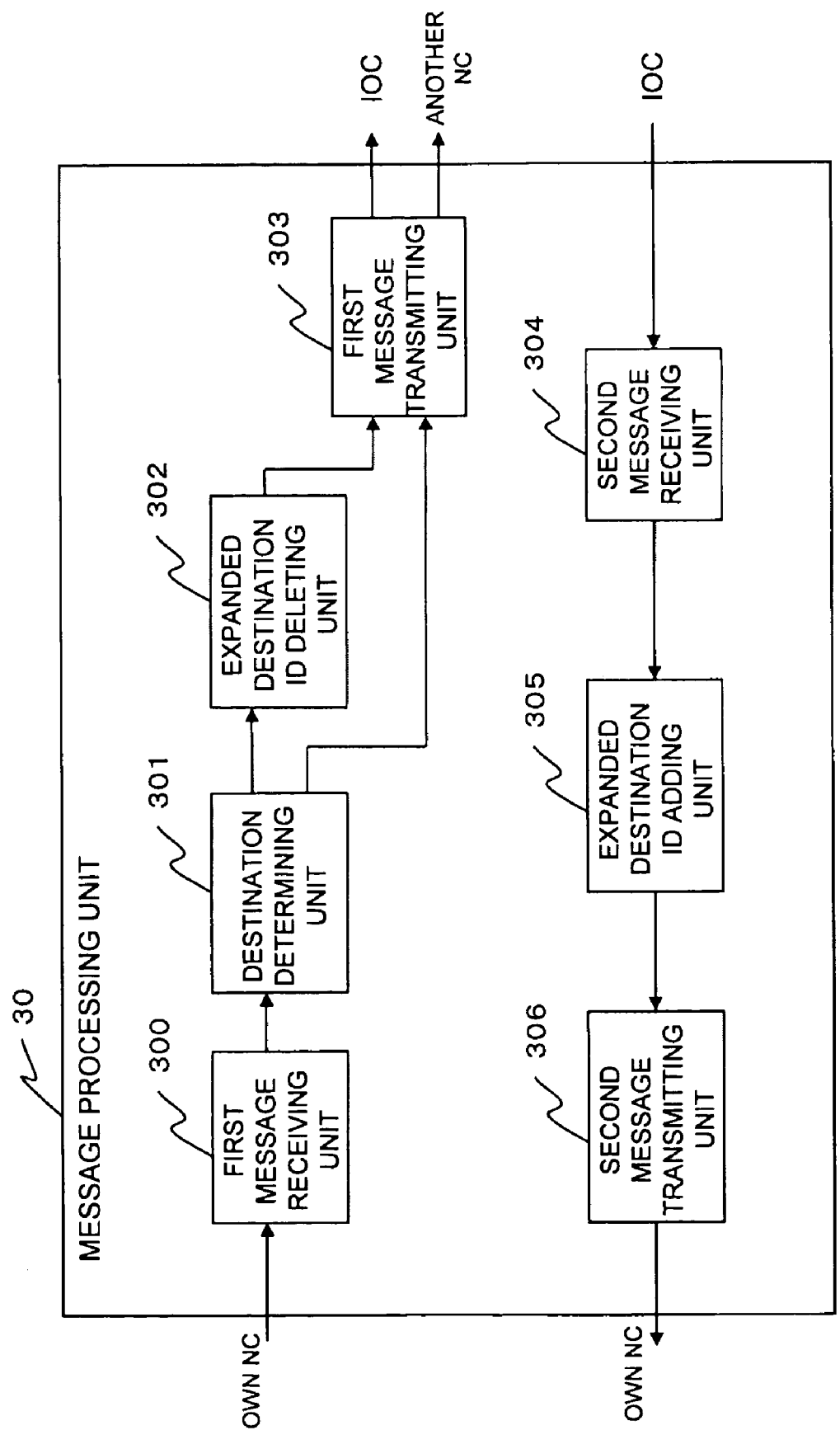
FIG. 6 is a diagram illustrating a detailed structure of a message processing unit.

FIG. 6 is a diagram illustrating a detailed structure of the message processing unit included in the cross bar.

The message processing unit 30 in the cross bar 3 includes a first message receiving unit 300, a destination determining unit 301, an expanded destination ID deleting unit 302, a first message transmitting unit 303, a second message receiving unit 304, an expanded destination ID adding unit 305, and a second message transmitting unit 306. The message processing unit 30 illustrated in FIG. 2 may include a plurality of message processing unit 30.

The following is explanation concerning an example of a transmission and reception relation of the message 5 sent from the NC 21A belonging to the parent node 2A to the child node 4A via the cross bar 3.

In the following explanation, an NC belonging to a parent node (the parent node 2A) is defined as an own NC (the NC 21A) and a child node to which the own NC corresponds is defined as a IOC-belonging child node 4 (the child node 4A). NCs other than the own NC (the NC 21A) are defined as other NCs (NCs 21B to 21D).

In FIG. 6, the first message receiving unit 300 receives the message 5 illustrated in FIG. 4A from the own NC. Subsequently, the message 5 is sent to the destination determining unit 301. The destination determining unit 301 determines, based on the expanded destination ID, whether the message 5 is the message 5 to the IOCs in the IOC-belonging child node 4 or the message 5 to the other NCs (through the other NCs).

When the destination determining unit 301 determines that the message 5 is the message 5 to the IOCs in the IOC-belonging child node 4, the destination determining unit 301 sends the message 5 to the expanded destination ID deleting unit 302. The expanded destination ID is deleted from the sent message 5 in the expanded destination ID deleting unit 302 and the message 5 is changed to the fixed format.

The destination determining unit 301 transmits the message 5, from which the expanded destination ID is deleted, to the IOC 40 determined by the first message transmitting unit 303. When the destination determining unit 301 determines that the message 5 is the message 5 to the other NCs, the destination determining unit 301 sends the message 5 to the first message transmitting unit 303 while keeping the present format. The first message transmitting unit 303 transmits the message 5 to the other NCs.

On the other hand, the message processing unit 30 receives, in the second message receiving unit 304, the message 5 of the fixed format from the IOC 40. Further, this message 5 is sent from the second message receiving unit 304 to the expanded destination ID adding unit 305 and processed as explained below.

The expanded destination ID adding unit 305 creates, for example, a 2-bit expanded destination ID. The expanded destination ID is, for example, a node ID (e.g., 2 bits) of an IOC40 belonging to a child node as a message transmission source. Thereafter, the expanded destination ID adding unit 305 adds the expanded destination ID to the variable area.

The second message transmitting unit 306 receives the message 5 of the fixed format from the expanded destination ID adding unit 305 and transmits the message 5 to the own NC corresponding to the IOC-belonging child node 4 to which the IOC 40 as the message transmission source belongs.

Figure 7:
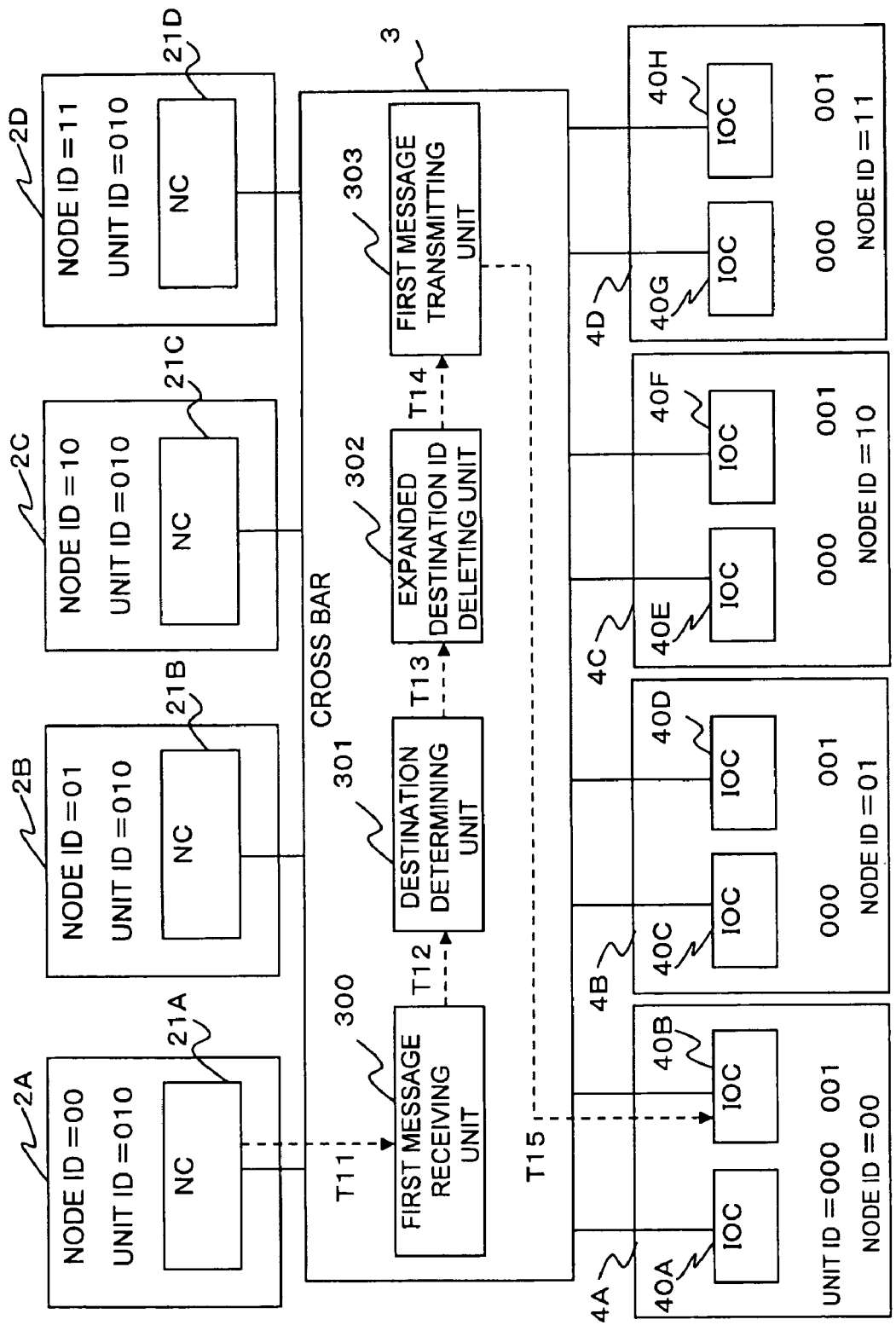
FIG. 7 is a diagram for explaining first processing in the message processing unit.
Figure 8:
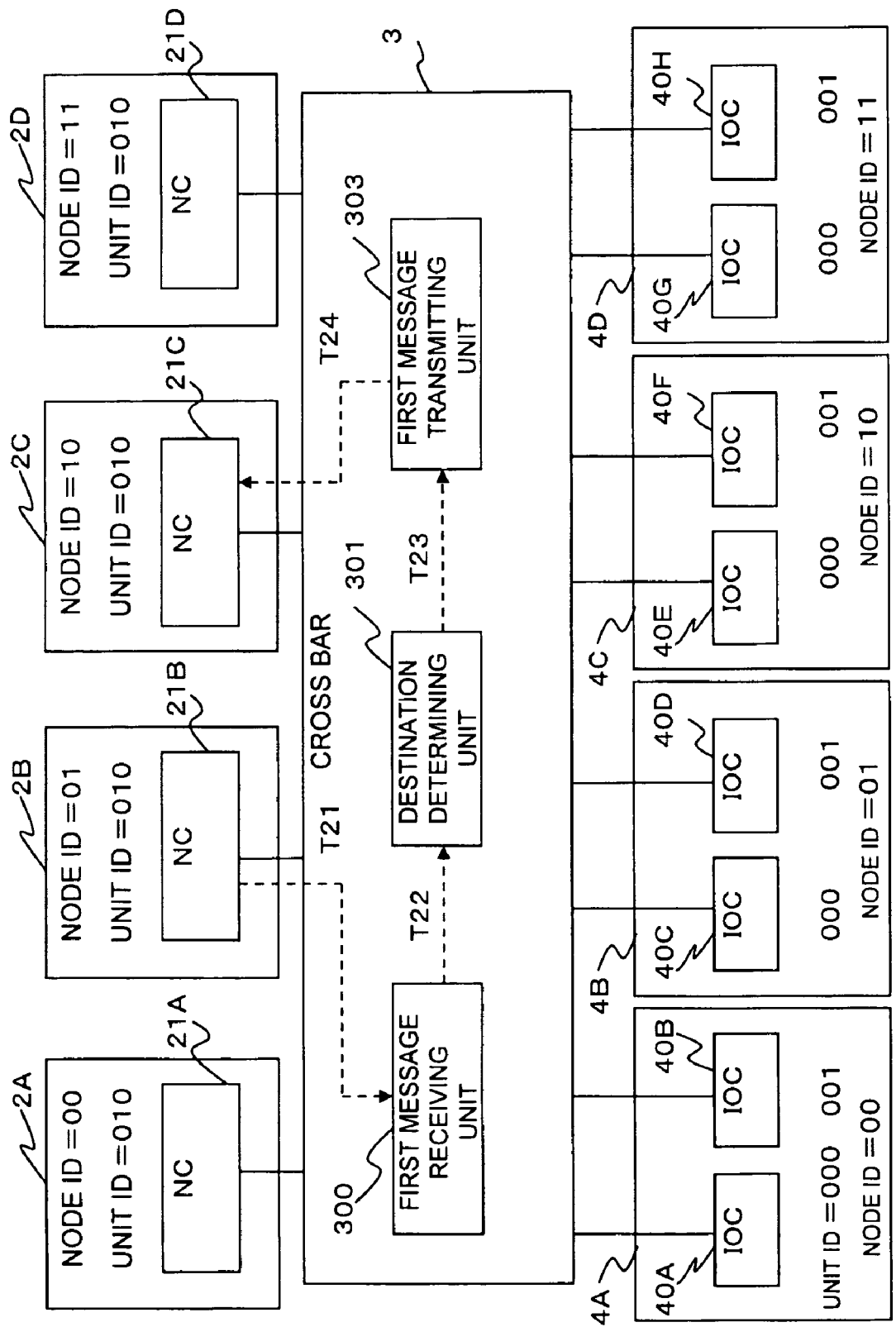
FIG. 8 is a diagram for explaining second processing in the message processing unit.
Figure 9:
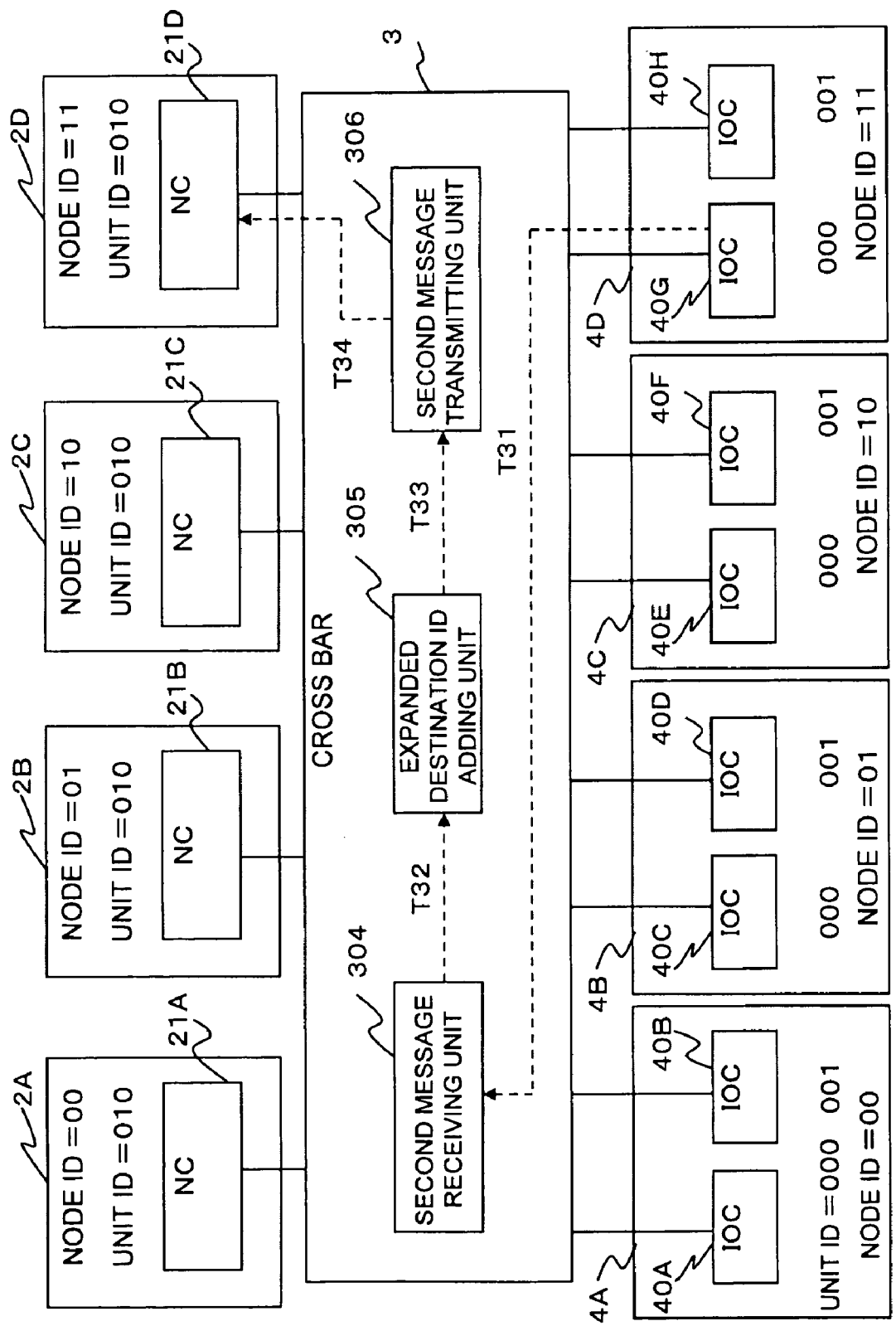
FIG. 9 is a diagram for explaining third processing in the message processing unit.

FIGS. 7 to 9 are diagrams illustrating first processing, second processing, and third processing in the message processing unit 30 of the cross bar 3. In FIGS. 7 to 9, the message processing unit 30 is not illustrated and only functional units necessary for operation explanation are illustrated.

It is assumed that, in the message 5 transmitted and received concerning the NC 21, the expanded destination ID of the message 5 has 2 bits. The 2 bits of the expanded destination ID represent a node ID and 3 bits of the destination ID represent a unit ID of the NC 21 or the IOC 40.

The first message receiving unit 300 receives the message 5 transmitted from the NC 21. The destination determining unit 301 determines a destination based on the destination ID and the expanded destination ID of the received message 5. Specifically, the destination determining unit 301 performs processing explained below based on the received message 5.

The destination determining unit 301 determines that, for example, in the case of the destination ID=010, the NC 21 is the destination and, in the case of the destination ID=000 or 001, the IOC 40 is the destination.

FIG. 7 illustrates message transfer processing from the own NC in the cross bar 3 to the IOCs belonging to the IOC-belonging child node 4 (hereinafter referred to as first processing).

As an example of the first processing, processing executed by the message processing unit 30 in the cross bar 3 when message transfer processing from the NC 21A to the IOC 40B occurs is explained. In the example explained below, it is assumed that the expanded destination ID added to the message 5 is "00".

The message 5 including the destination information is transmitted from the NC 21A and received by the first message receiving unit 300 in the message processing unit 30 of the cross bar 3 (T11). The destination determining unit 301 receives the received message 5 (T12), determines, from 2 bits of the expanded destination ID included in the message 5, to which node the message 5 is sent, and determines, from 3 bits of the destination ID, which unit is a destination unit.

The destination determining unit 301 determines that the destination node is the IOC-belonging child node 4, since "node ID=00" of the own NC (the NC 21A) and 2 bits of the expanded destination ID are the same "00". In addition, the destination determining unit 301 determines that the destination unit is the IOC unit (IOC 40B belonging to the IOC-belonging child node 4), since 3 bits of the destination ID are "001".

Subsequently, the destination determining unit 301 sends the received message 5 to the expanded destination ID deleting unit 302 (T13). The expanded destination ID deleting unit 302 sends the message obtained by deleting the information of the expanded destination ID from the received message 5 to the first message transmitting unit 303 (T14). The first message transmitting unit 303 transmits the message 5 to the IOC 40B as the destination of the message 5 (T15). Consequently, message transfer processing from the own NC to the IOCs in the IOC-belonging child node 4 can be realized.

FIG. 8 illustrates message transfer processing from the own NC in the cross bar 3 to another NC (hereinafter referred to as second processing).

As an example of the second processing, processing performed when message transfer processing from the NC 21B to the NC 21C occurs is explained. In the example explained below, it is assumed that the expanded destination ID added to a message is 10.

The message 5 including the destination information is transmitted from the NC 21B and received by the first message receiving unit 300 (T21).

The destination determining unit 301 receives the received message 5 (T22), determines, from 2 bits of the expanded destination ID of the information, which node the message 5 is sent to, and determines, from 3 bits of the destination ID, which unit is a destination unit. In this case, since a node ID of the own NC (the NC 21B) is "01" and 2 bits of the expanded destination ID is "10", the destination determining unit 301 determines that the destination is the other NC (the NC 21C).

In the case of message transmission from the own NC to the other NC, the destination determining unit 301 does not delete the expanded destination ID added to the message and sends the message 5 to the first message transmitting unit 303 (T23). The first message transmitting unit 303 that receives the message 5 transmits the message 5 to the other NC (the NC 21C) (T24). Consequently, message transfer processing from the own NC to another NC can be realized.

FIG. 9 illustrates message transfer processing from the IOC belonging to the IOC-belonging child node 4 in the cross bar 3 to the own NC (hereinafter referred to as third processing).

As an example of the third processing, processing performed when message transfer processing from the IOC 40G to the NC 21D occurs is explained. In the example explained below, it is assumed that the "expanded destination ID" added to a message is "11".

The IOC 40G transmits the message 5 of the fixed format to the cross bar 3. The second message receiving unit 304 in the cross bar 3 receives the message 5 from the IOC 40G (T31).

This message 5 is further sent from the second message receiving unit 304 to the expanded destination ID adding unit 305 (T32) and processed by the expanded destination ID adding unit 305 as explained below.

The expanded destination ID adding unit 305 adds the "node ID=11" of an IOC40G belonging to a child node as a message transmission source to the fixed format as the "expanded destination ID=11".

Subsequently, the expanded destination ID adding unit 305 sends the message 5 with the expanded destination ID added to the second message transmitting unit 306 (T33). The second message transmitting unit 306 receives the message 5 from the expanded destination ID adding unit 305 and transmits the message 5 to the own NC (the NC 21D) corresponding to the child node belonging to the IOC 40G (T34). Consequently, transfer processing for the message 5 from the IOC in the IOC-belonging child node 4 to the own NC can be executed.

For example, when the message 5 from the CPU 200 belonging to the corresponding parent node 2 is transmitted to the CPU 200 belonging to the non-corresponding parent node 2, processing for message transfer from the own NC 21 via another NC 21 is performed according to the second processing.

When the message 5 from the CPU 200 belonging to the corresponding parent node 2 is transmitted to the IOC 40 belonging to the non-corresponding parent node 2, after the execution of the second processing, the first processing is executed.

As explained above, according to the method for communicating between nodes, the message 5 obtained by adding the information of the expanded destination ID to the format of the message of the existent server apparatus 1 is transmitted and received by the NC 21 and the cross bar 3. Further, the message 5 transmitted and received on the IOC 40 side is processed in the message format of the existent server apparatus 1 by the cross bar 3.

According to the method for communicating between nodes, without performing change, replacement, and the like on the IOC side, the message 5 from a unit is transmitted to the CPU 200 of the parent node 2 to which an added NC belongs, or is transmitted to the added IOC 40.

Figure 10:
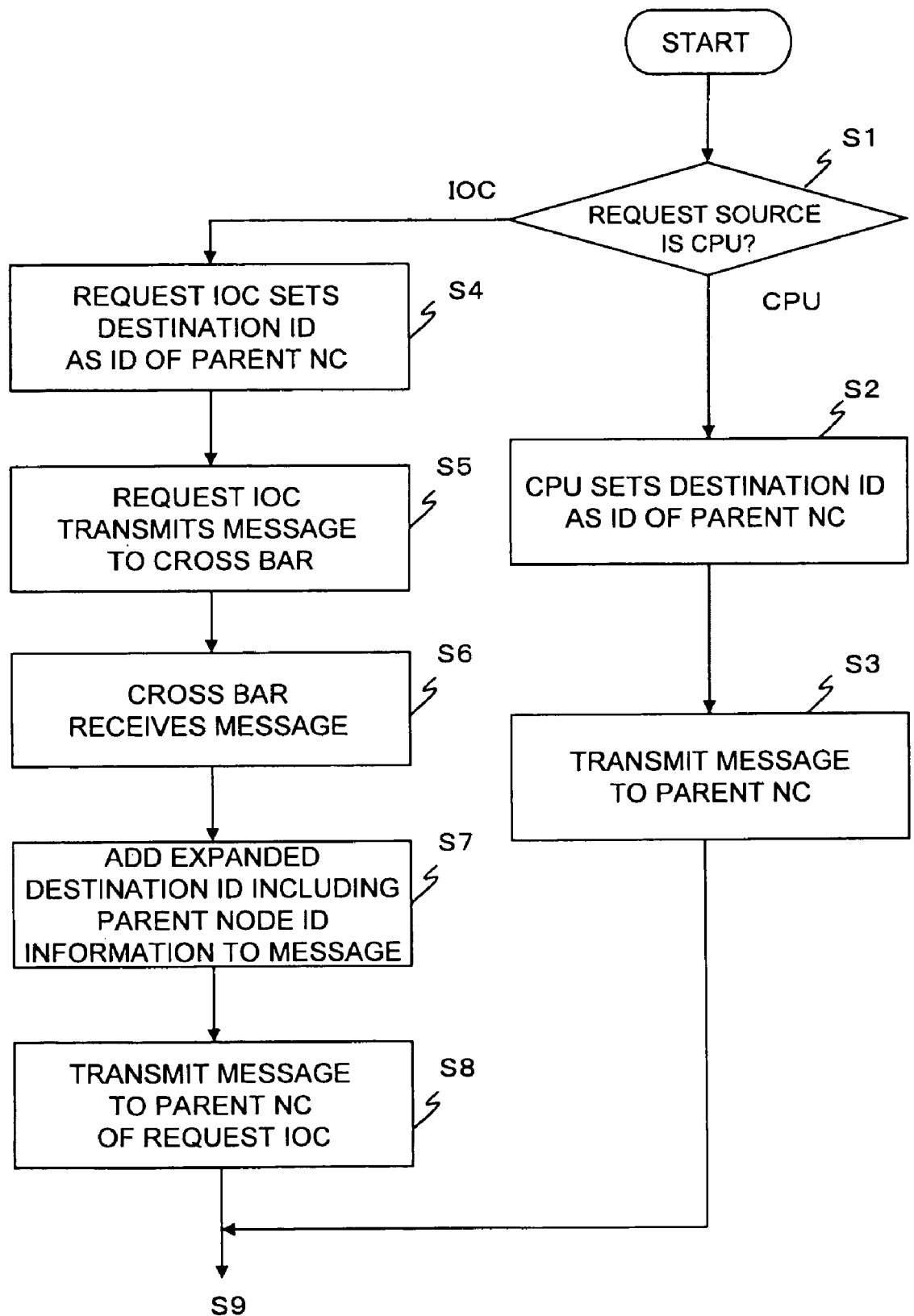
FIG. 10 is a node expansion processing flow.
Figure 11:
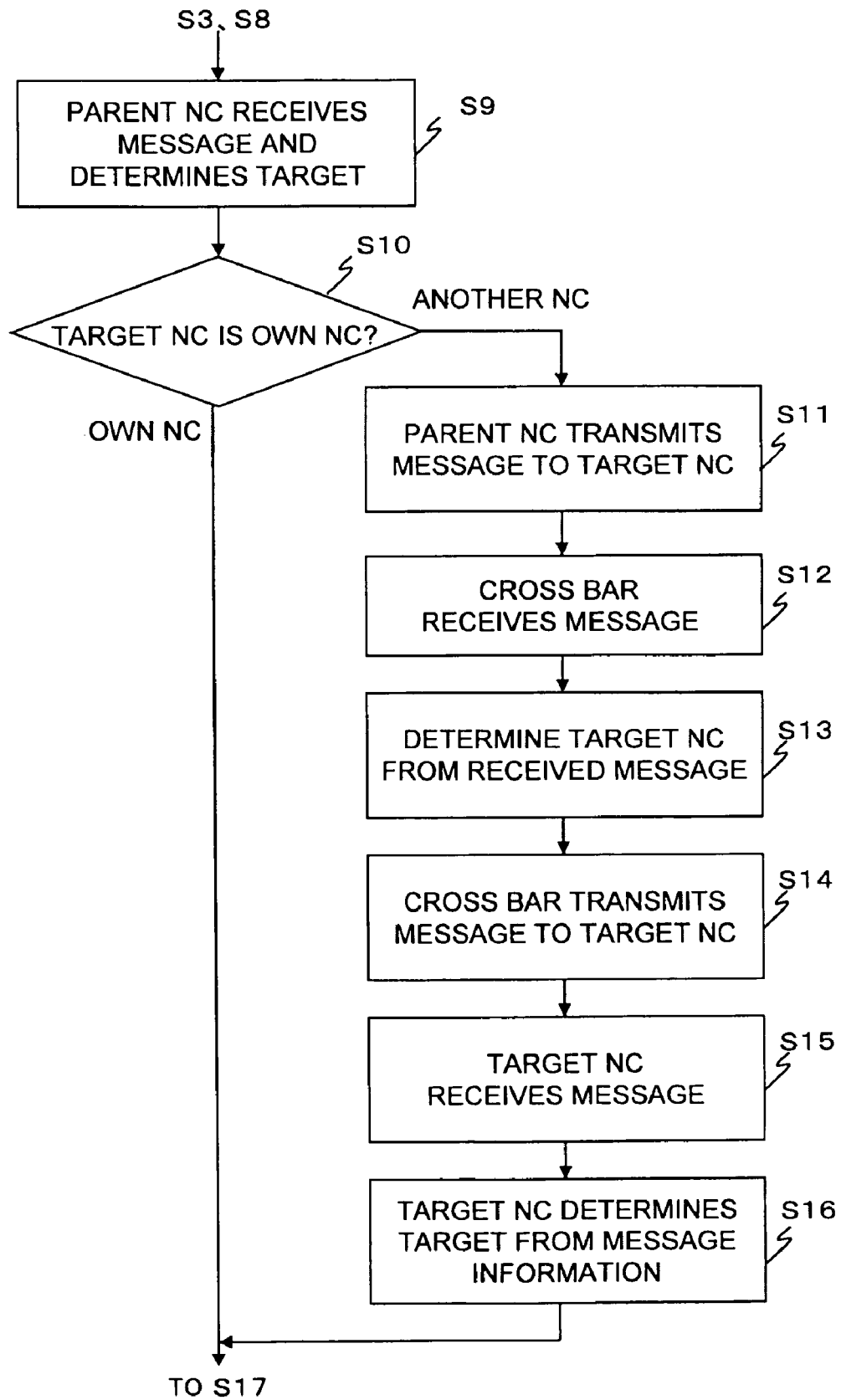
FIG. 11 is the node expansion processing flow.
Figure 12:
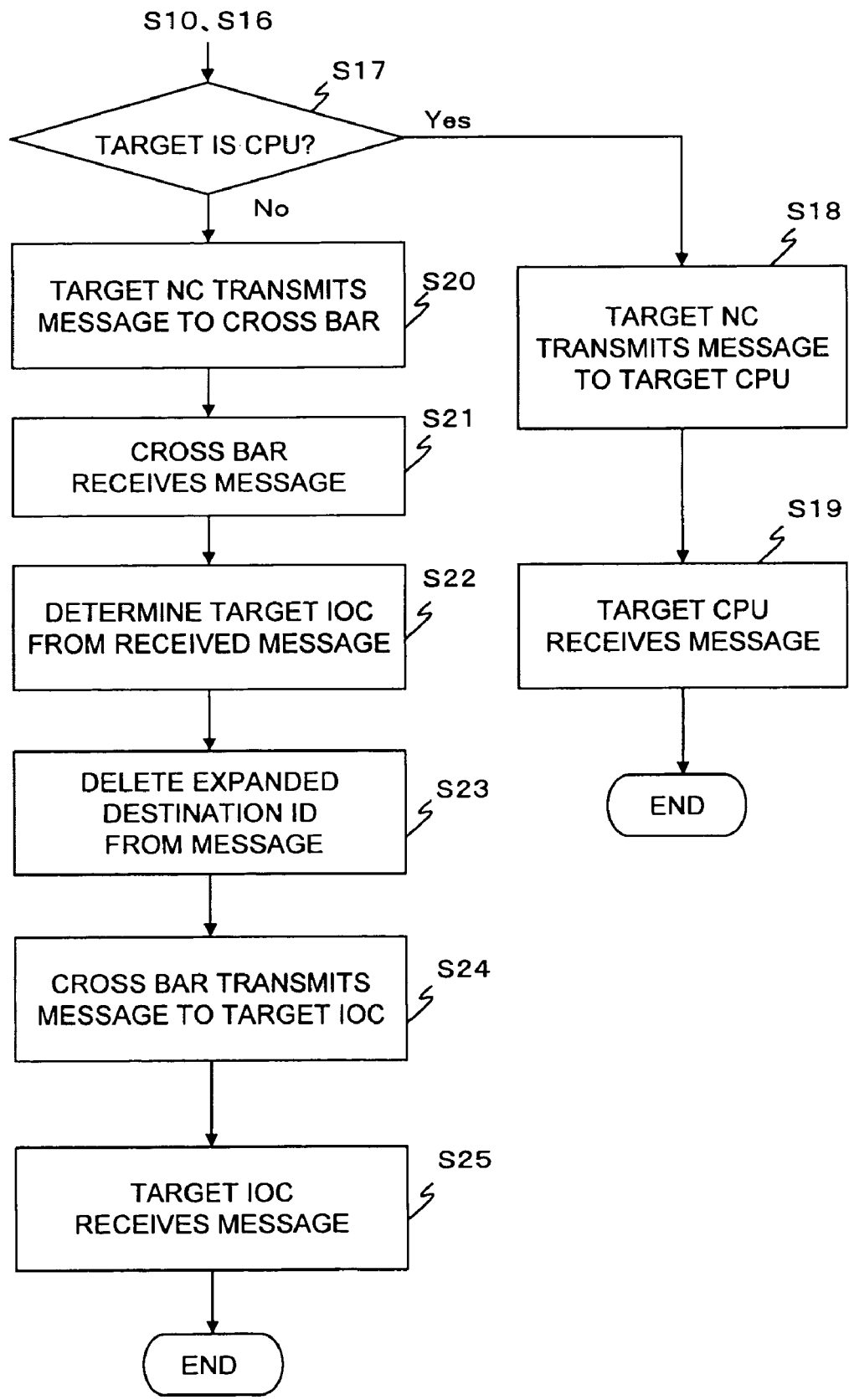
FIG. 12 is the node expansion processing flow.

FIGS. 10 to 12 illustrate a node expansion processing flow in the server system illustrated in FIG. 1. FIGS. 10 to 12 are integrated to illustrate one node expansion processing.

In this server system, the processing from the determination of a destination of the message 5 by the parent NC 21 until the transmission of the message 5 to a target destination is executed as explained below according to whether a transmission source of the message 5 is the CPU 200 or the IOC 40.

When the transmission source of the message 5 is the CPU 200 in step S1, the CPU 200 as the transmission source sets the destination ID (illustrated in FIG. 4A or 5A) in the message 5 as an ID (a unit ID) of the parent NC 21 (step S2). After this setting, the CPU 200 as the transmission source transmits the message 5 to the parent NC 21 (step S3). After this processing, step S9 illustrated in FIG. 11 is executed.

On the other hand, when the transmission source of the message 5 is the IOC 40 in step S1, the IOC 40 as the transmission source sets the destination ID in the message 5 as the ID of the parent NC 21 (step S4). After this setting, the IOC 40 transmits the message 5 to the cross bar 3 (step S5).

The cross bar 3 receives this message 5 (step S6) and adds information including a parent node ID of the IOC 40 as the transmission source to the received message 5 as an expanded destination ID (step S7). The cross bar 3 transmits the message 5 with the expanded destination ID added to the parent NC 21 of the IOC 40 as the transmission source (step S8).

Thereafter, the parent NC 21 receives the message 5 from the IOC 40 sent through the CPU 200 or the cross bar 3 and determines a target destination (a destination of the message 5) from the message 5 (step S9). The parent NC 21 checks, based on a result of the determination, whether the NC which is the target destination (the target NC) 21 is the own NC (step S10). When the target destination is the own NC, step S17 illustrated in FIG. 12 is executed.

When the target destination is not the own NC (is another NC), the parent NC 21 transmits the message 5 to the target NC 21 (step S11). The cross bar 3 receives this message 5 from the parent NC 21 (step S12) and determines the target NC 21 based on the expanded destination ID of the received message 5 (step S13). The cross bar 3 transmits the message 5 with the expanded destination ID added to the target NC 21 (step S14).

The target NC 21 receives the message 5 (step S15) and determines a target destination from the message 5 (step S16).

Thereafter, the target NC 21 or the parent NC 21 (hereinafter simply referred to as target NC 21) checks whether a target is the CPU 200 (step S17). When the target is the CPU 200, the target NC 21 transmits the message 5 to the target CPU 200 (step S18). The target CPU 200 receives this message 5 (step S19). The transmission processing for the message 5 ends.

On the other hand, when the target is not the CPU 200, the target NC 21 transmits the message 5 to the cross bar 3 (step S20). The cross bar 3 receives this message 5 (step S21) and determines a target destination from the received message 5 (step S22). In the cross bar 3, the message processing unit 30 deletes the expanded destination ID from the message 5 (step S23).

Thereafter, the cross bar 3 transmits the message 5, from which the expanded destination ID is deleted, to the target IOC 40 (step S24). The target IOC 40 receives this message 5 (step S25). The transmission processing for the message 5 ends.

Figure 13:
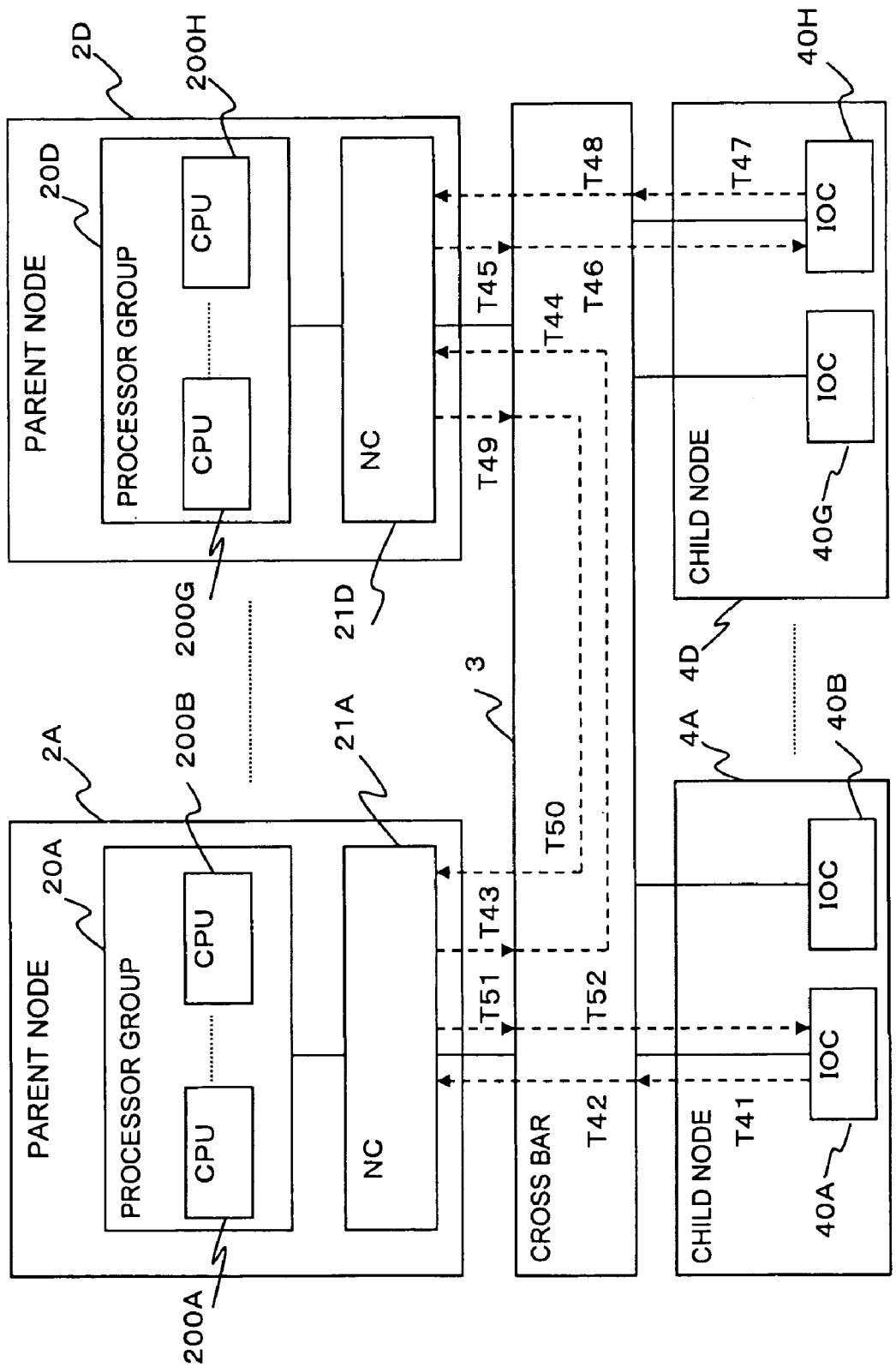
FIG. 13 is a diagram for explaining a first example of node expansion processing.
Figure 14:
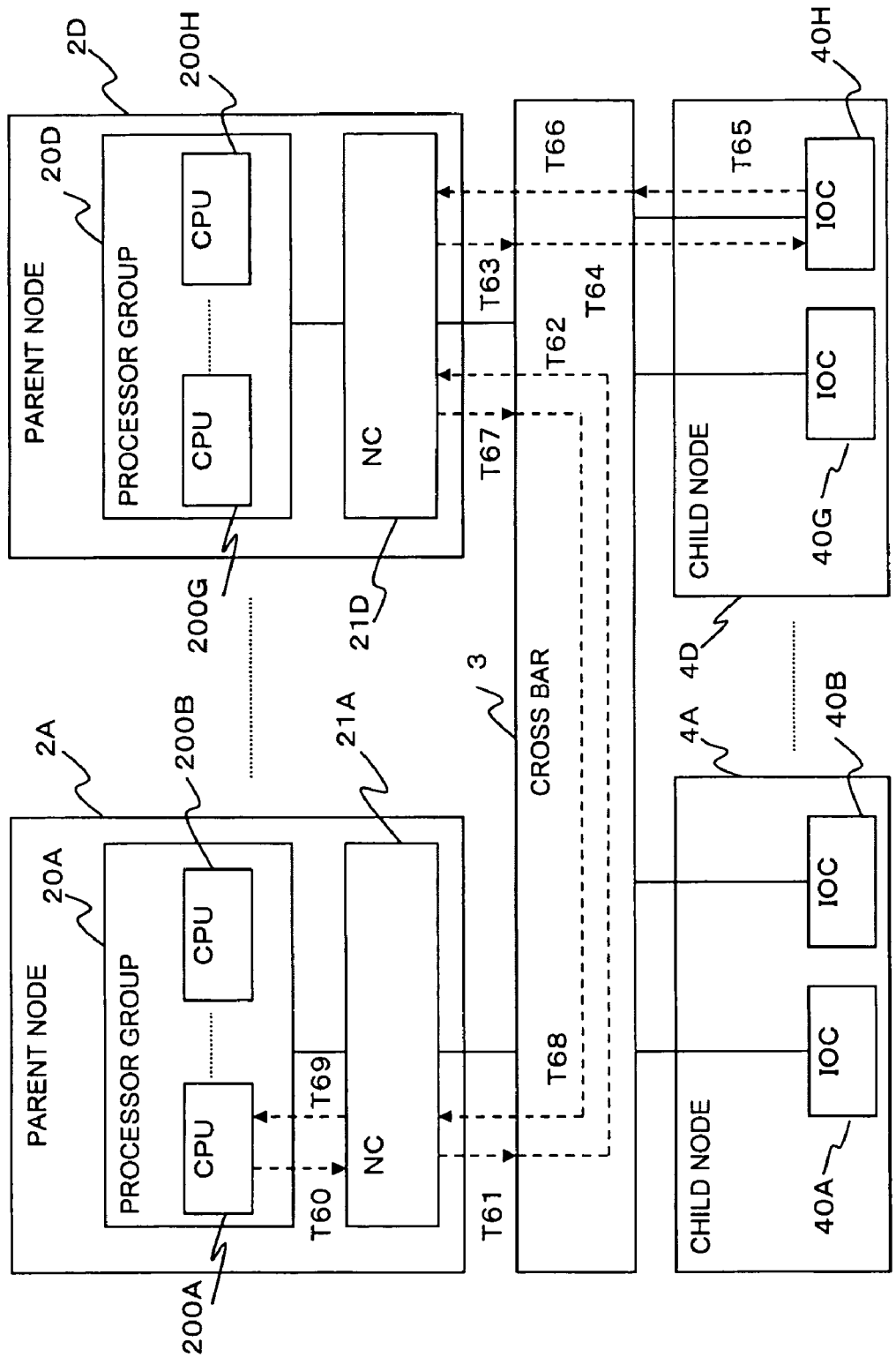
FIG. 14 is a diagram for explaining a second example of the node expansion processing.
Figure 15:
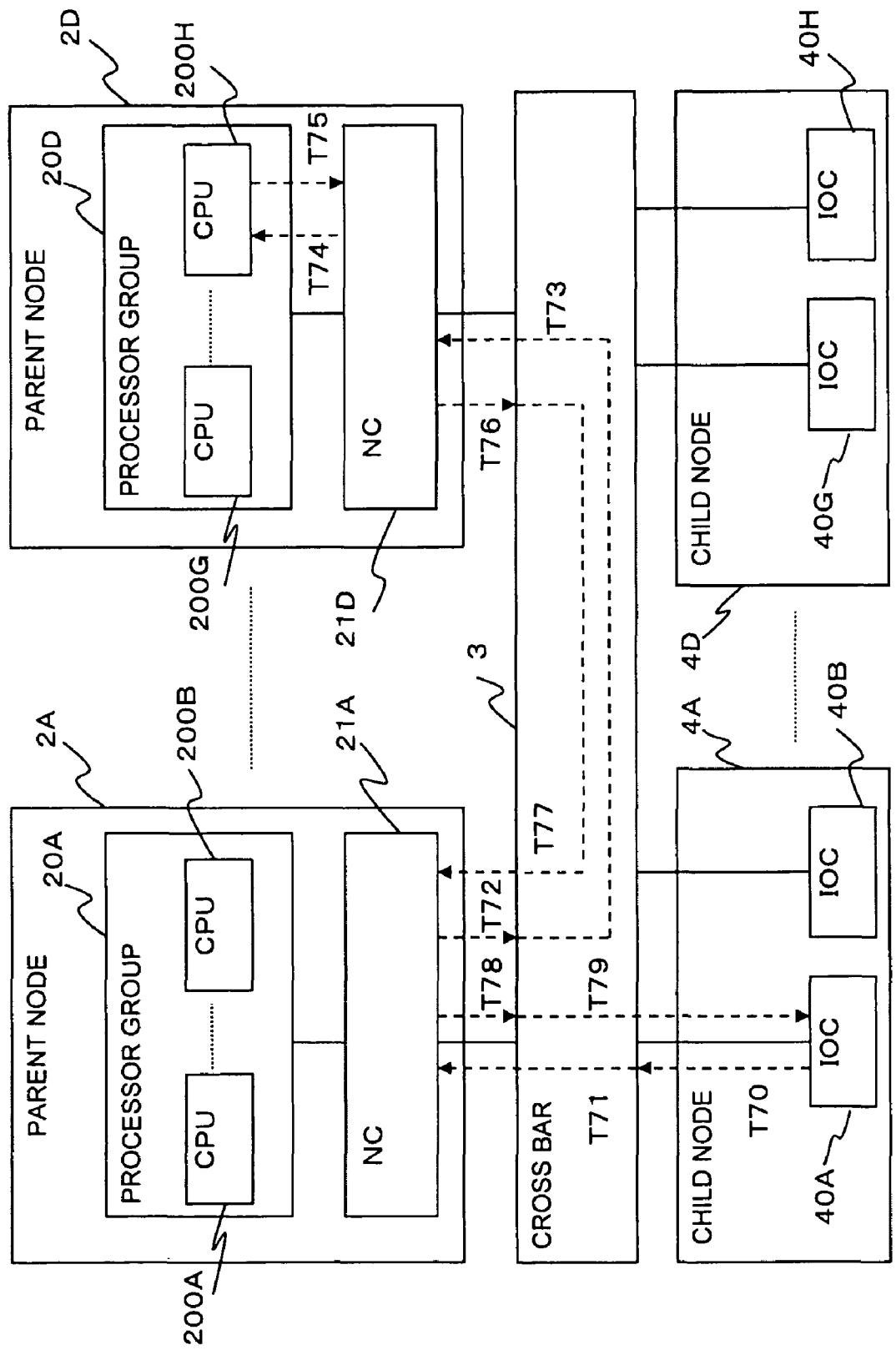
FIG. 15 is a diagram for explaining a third example of the node expansion processing.

FIGS. 13, 14 and 15 are diagrams respectively illustrating a first example, a second example, and a third example of the operation of the method for communicating between nodes. A structure of the server system illustrated in FIGS. 13 to 15 is the same as the structure illustrated in FIG. 2.

Specifically, FIG. 13 illustrates an operation performed when the message 5 is issued from the IOC 40A belonging to the child node 4A to the IOC 40H belonging to the child node 4D, which is the target (the first example of the operation).

The IOC 40A belonging to the child node 4A sets the target address and so on (illustrated in FIGS. 4A to 4C and FIGS. 5A to 5B) of the message 5 to the IOC 40H and transmits the message 5 including information with an ID of the parent NC 21A set as "destination ID=010" to the cross bar 3 (T41).

The cross bar 3 receives the message 5 of the fixed format from the IOC 40A belonging to the child node A. The message processing unit 30 (not illustrated) in the cross bar 3 adds the expanded destination ID to the received message 5. In this case, the expanded destination ID is "expanded destination ID=00" (2 bits) including "node ID=00" (2 bits) of the parent node 2A of the IOC 40A.

The cross bar 3 transmits the message 5 obtained by adding the expanded destination ID to the message 5 received from the IOC 40A to the parent NC 21A of the IOC 40A (T42).

The NC 21A receives the message 5 with the expanded destination ID added from the cross bar 3. Subsequently, the destination determining unit 22A (not illustrated) in the NC 21A determines a target destination from the received message 5. The target destination is determined based on the target address and the message type of the message 5 illustrated in FIGS. 4A to 4C and FIGS. 5A to 5B and is not determined based on the "destination ID".

In this case, the destination determining unit 22A determines the IOC 40H as the target destination according to determination processing. The destination determining unit 22A sets "expanded destination ID=11" including "node ID=11" of the parent node 2D of the IOC 40H and "destination ID=010" including "unit ID=010" of the NC 21D. After the destination determining unit 22A rewrites the expanded destination ID and the destination ID of the message 5, the NC 21A transmits the message 5 to the cross bar 3 (T43).

The cross bar 3 receives the message 5 from the NC 21A and performs destination determination in the message processing unit 30. The message processing unit 30 determines the NC 21D of the node 2D corresponding to "expanded destination ID=11" as a destination. Further, since the cross bar 3 determines that the destination is a node ID of another NC based from the message 5 received from the NC 21A, the cross bar 3 transmits the message 5 as it is to the NC 21D (T44).

The NC 21D receives the message 5 with the expanded destination ID added from the cross bar 3 and determines a target destination with the destination determining unit 22D. In this case, the destination determining unit 22D determines the IOC 40H belonging to the IOC-belonging child node 4D as the target destination. After this determination, since the target destination is the IOC 40H belonging to the IOC-belonging child node 4D, the destination determining unit 22D transmits the message 5, in which a value of the expanded destination ID is kept, to the cross bar 3 (T45).

The cross bar 3 receives the message 5 with the expanded destination ID added from the NC 21D and performs destination determination in the message processing unit 30. The message processing unit 30 determines that the message 5 is sent from the parent node NC 21D to the IOC 40H belonging to the child node 4D. The message processing unit 30 deletes the expanded destination ID added to the message 5 from the message 5. The message 5 conforming to the fixed format after the deletion of the expanded destination ID is transmitted from the cross bar 3 to the IOC 40H in the child node 4D (T46).

After the IOC 40H which is the target destination receives the message 5 of the fixed format from the cross bar 3, the IOC 40H transmits the response message 5 to the message 5 to the cross bar 3 (T47). In the following T48 to T52, transmission processing for the response message 5 is executed in the same manner as the processing for the message 5 with the order of the execution reversed.

Specifically, FIG. 14 illustrates an operation performed when the message 5 with the IOC 40H belonging to the child node 4D set as a target is issued from the CPU 200A of the processor group 20A belonging to the parent node 2A (the second example of the operation).

The CPU 200A belonging to the parent node 2A sets the target address and so on of the message 5 as the IOC 40H and transmits the message 5 including information with the ID of the parent NC 21A set as "destination ID=010" to the NC 21A (T60).

The NC 21A receives the message 5 from the CPU 200A. Subsequently, the destination determining unit 22A in the NC 21A determines a target destination from the received message 5.

In this case, the destination determining unit 22A determines the IOC 40H as the target destination according to determination processing. The destination determining unit 22A sets "expanded destination ID=11" including "node ID=11" of the parent node 2D of the IOC 40H and "destination ID=010" including "unit ID=010" of the NC 21D. After the destination determining unit 22A adds the expanded destination ID to the message 5, the NC 21A transmits the message 5 to the cross bar 3 (T61).

The cross bar 3 receives the message 5 from the NC 21A and performs destination determination in the message processing unit 30. The message processing unit 30 determines, from 2 bits of "expanded destination ID=11" added to the message 5, the NC 21D belonging to the corresponding node 2D as a destination. Further, since the cross bar 3 determines that the destination is a node ID of another NC from the message 5 received from the NC 21A, the cross bar 3 directly transmits the message 5 to the NC 21D (T62).

The NC 21D receives the message 5 with the expanded destination ID added from the cross bar 3 and determines a target destination with the destination determining unit 22D. In this case, the destination determining unit 22D determines the IOC 40H belonging to the IOC-belonging child node 4D as the target destination. After this determination, since the target destination is the IOC 40H belonging to the IOC-belonging child node 4D, the destination determining unit 22D transmits the message 5 to the cross bar 3 without changing the expanded destination ID (T63).

The cross bar 3 receives the message 5 with the expanded destination ID added from the NC 21D and performs destination determination in the message processing unit 30. The message processing unit 30 determines that the message 5 is sent from the parent node NC 21D to the IOC 40H belonging to the child node 4D. The message processing unit 30 deletes the expanded destination ID added to the message 5 from the message 5. The message 5 of the fixed format after the deletion of the expanded destination ID is transmitted from the cross bar 3 to the IOC 40H in the child node 4D (T64).

The IOC 40H which is the target destination receives this message 5 from the cross bar 3 and transmits the response message 5 to the message 5 to the transmission source (T65). In the following T66 to T69, transmission processing for the response message 5 is executed in the same manner as the processing for the message 5 with the order of the execution reversed.

Specifically, FIG. 15 illustrates an operation performed when the message 5 with the CPU 200H of the processor group 20D belonging to the parent node 2D set as a target is issued from the IOC 40A in the child node 4A (the third example of the operation).

The IOC 40A belonging to the child node 4A sets a target address and so on of a message issue destination in the CPU 200H and transmits the message 5 including information with the ID of the parent NC 21A set as "destination ID=010" to the cross bar 3 (T70).

The cross bar 3 receives the message 5 from the IOC 40A belonging to the child node 4A. The message processing unit 30 in the cross bar 3 adds the expanded destination ID to the received message 5. In this case, the expanded destination ID is "expanded destination ID=00" (2 bits) including "node ID=00" (2 bits) of the parent node 2A of the IOC 40A.

The cross bar 3 transmits the message 5 obtained by adding the expanded destination ID to the message 5 received from the IOC 40A to the parent NC 21A (T71).

The NC 21A receives the message 5 with the expanded destination ID added from the cross bar 3. Subsequently, the destination determining unit 22A in the NC 21A processes the received message 5. The destination determining unit 22A determines a target destination from the received message 5. The target destination is determined based on the message 5 illustrated in FIGS. 4A to 4C and FIGS. 5A to 5B. The target destination does not indicate destination ID information (3 bits) and is determined from a target address or a message type.

In this case, the destination determining unit 22A determines the IOC 40H as the target destination according to determination processing. The destination determining unit 22A sets "expanded destination ID=11" including "node ID=11" of the parent node 2D of the IOC 40H and "destination ID=010" including "unit ID=010" of the NC 21D. After the destination determining unit 22A rewrites the expanded destination ID added to the message 5, the NC 21A transmits the message 5 to the cross bar 3 (T72).

The cross bar 3 receives the message 5 from the NC 21A and performs destination determination in the message processing unit 30. The message processing unit 30 determines the NC 21D of the node 2D corresponding to 2 bits of "expanded destination ID=11" as a destination. Since the cross bar 3 determines, with the message processing unit 30, that the destination is a node ID of another NC from the message 5 received from the NC 21A, the cross bar 3 directly transmits the message 5 to the NC 21D (T73).

The NC 21D receives the message 5 with the expanded destination ID added from the cross bar 3 and determines a target destination with the destination determining unit 22D. In this case, the destination determining unit 22D determines the CPU 200H in the processor group 20D as the target destination. After this determination, the NC 21D transmits the message 5 to the CPU 200H belonging to the own node 2D (T74). In T75 to T79, transmission processing for the response message 5 is executed in the same manner as the processing for the message 5 with the order of the execution reversed.

When the destination determining unit 22 transmits the message 5 to the processor group 20, the destination determining unit 22 may transmit the message 5 from which the expanded destination ID is deleted. In this case, it is possible to make the CPU 200 side to cope with the message 5 of the fixed format as well.

All examples and conditional language recited herein are intended for pedagogical purpose to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present inventions have been described in detail, it should be understood that the various changes, substitutions, and alterations could be made hereto without departing from the sprit and scope of the invention.

What is claimed is:

1. A method to communicate between nodes in a server apparatus that includes a plurality of input/output devices, a plurality of processor groups each having a plurality of processors, a plurality of node controllers connected to the plurality of processor groups, and a cross bar provided between the plurality of input/output devices and the plurality of node controllers, and transmits and receives a message between the plurality of input/output devices and the plurality of processors via the cross bar, the method comprising:

associating each of the plurality of input/output devices with each of the plurality of node controllers;

transmitting a message from an input/output device to a cross bar designating a first node controller as a fixed destination, the first node controller being a node controller associated with the input/output device, the message including a fixed-length destination ID that is identification information assigned to an input/output device or a node controller that is to receive the message, and internal information to specify a target;

transmitting the message from the cross bar to the first node controller;

generating information indicating the target based on the internal information of the received message at the first node controller;

adding the generated information to the message;

transmitting the message added with the generated information from the first node controller to the cross bar designating a second node controller as a destination, the second node controller being a node controller associated with an input/output device that is the target or a node controller connected to a processor group having a processor that is the target;

restoring the message by deleting the generated information from the message added with the generated information at the cross bar; and transmitting the restored message to the second node controller.

2. The method according to claim 1, wherein the first node controller generates the information indicating the target by decoding a target address that is a part of the internal information of the received message and represents an address of the input/output device or the processor that is to receive the message in the step of generating the information indicating the target.

3. The method according to claim 1, wherein the first node controller generates the information indicating the target by decoding a message type that is a part of the internal information of the received message and represents a type of the message in the step of generating the information indicating the target.

4. The method according to claim 1, wherein the generating information includes an expanded destination ID.

5. The method according to claim 4, wherein the adding comprises rewriting an already existing expanded destination ID.

6. A server apparatus that includes a plurality of input/output devices, a plurality of processor groups each having a plurality of processors, a plurality of node controllers connected to the plurality of processor groups, and a cross bar provided between the plurality of input/output devices and the plurality of node controllers, and transmits and receives a message between the plurality of input/output devices and the plurality of processors via the cross bar, the server apparatus comprising:

an input/output device that is connected to the cross bar, and transmits a message to the cross bar designating a first node controller as a fixed destination, the first node controller being a node controller associated with the input/output device, the message including a fixed-length destination ID that is identification information assigned to an input/output device or a node controller that is to receive the message, and internal information to specify a target, and wherein the first node controller is connected to the cross bar, and generates information indicating the target based on the internal information of the received message, adds the generated information to the message, and transmits the message added with the generated information to the cross bar designating a second node controller as a destination, the second node controller being a node controller associated with an input/output device that is the target or a node controller connected to a processor group having a processor that is the target, and wherein the cross bar is connected to the second node controller and the input/output device which is the target, and transmits the message received from the input/output device or the processor to the first node controller, restores the message by deleting the generated information from the message added with the generated information and received from the first node controller, and transmits the restored message to the second node controller, and wherein each of the plurality of input/output devices is associated with each of the plurality of node controllers.

7. The server apparatus according to claim 6, wherein the generated information includes an expanded destination ID.

8. A non-transitory computer readable medium containing a program stored therein to execute, on a computer, a method to communicate between nodes in a server apparatus that includes a plurality of input/output devices, a plurality of processor groups each having a plurality of processors, a plurality of node controllers connected to the plurality of processor groups, and a cross bar provided between the plurality of input/output devices and the plurality of node controllers, and transmits and receives a message between the plurality of input/output devices and the plurality of processors via the cross bar, the program comprising:

associating each of the plurality of input/output devices with each of the plurality of node controllers;

transmitting a message from an input/output device to the cross bar designating a first node controller as a fixed destination, the first node controller is a node controller associated with the input/output device, the message including a fixed-length destination ID that is identification information assigned to an input/output device or a node controller that is to receive the message, and internal information to specify a target;

transmitting the message from the cross bar to the first node controller;

generating information indicating the target based on the internal information of the received message at the first node controller;

adding the generated information to the message;

transmitting the message added with the generated information from the first node controller to the cross bar designating a second node controller as a destination, the second node controller being a node controller associated with an input/output device that is the target or a node controller connected to a processor group having a processor that is the target;

restoring the message by deleting the generated information from the message added with the generated information at the cross bar; and transmitting the restored message to the second node controller.

9. The non-transitory computer readable medium according to claim 8, wherein the generating information includes an expanded destination ID.

* * * * *